United States Patent
Brown et al.

(10) Patent No.: US 7,952,633 B2
(45) Date of Patent: May 31, 2011

(54) APPARATUS FOR CONTINUOUS CLOCKING OF TDI SENSORS

(75) Inventors: David Lee Brown, Sunnyvale, CA (US); Kai Cao, Fremont, CA (US); Yung-Ho Chuang, Cupertino, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 1106 days.

(21) Appl. No.: 11/292,754

(22) Filed: Dec. 1, 2005

(65) Prior Publication Data

US 2007/0064135 A1  Mar. 22, 2007

Related U.S. Application Data

(63) Continuation-in-part of application No. 10/992,063, filed on Nov. 18, 2004.

(51) Int. Cl.
 H04N 3/14 (2006.01)
 H04N 5/335 (2011.01)
 H01L 27/148 (2006.01)
 H01L 29/66 (2006.01)
(52) U.S. Cl. ........ 348/295; 348/294; 348/300; 348/311; 348/312; 348/316; 257/235; 257/236; 257/215
(58) Field of Classification Search ........... 348/294–324
 See application file for complete search history.

(56) References Cited

U.S. PATENT DOCUMENTS

| | | | | |
|---|---|---|---|---|
| 3,660,697 A | * | 5/1972 | Berglund et al. | 327/565 |
| 3,921,194 A | * | 11/1975 | Engeler et al. | 257/246 |
| 4,857,996 A | * | 8/1989 | Hirano et al. | 348/250 |
| 5,019,884 A | * | 5/1991 | Yamawaki | 257/240 |
| 5,453,781 A | * | 9/1995 | Stein | 348/169 |
| 5,796,801 A | * | 8/1998 | Nakashiba | 377/60 |
| 6,421,086 B1 | | 7/2002 | Kuno et al. | |

(Continued)

OTHER PUBLICATIONS

Fischer, Jan: "DSP Based MEasuring Line-scan CCD Camera," Sep. 2003, IEEE International Workshop on Intelligent Data acquisition and Advanced Computing Systems, pp. 345-348.*

(Continued)

*Primary Examiner* — Jason Chan
*Assistant Examiner* — Michael Osinski
(74) *Attorney, Agent, or Firm* — Smyrski Law Group, A P.C.

(57) ABSTRACT

A method and apparatus for propagating charge through a sensor and implementation thereof is provided. The method and apparatus may be used to inspect specimens, the sensor operating to advance an accumulated charge between gates of the TDI sensor. The design implementation provides a set of values representing a plurality of out of phase signals, such as sinusoidal or trapezoidal signals. These out of phase signals are converted and transmitted to the sensor. The converted signals cause the sensor to transfer charges in the sensor toward an end of the sensor. Aspects such as feed through correction and correction of nonlinearities are addressed.

26 Claims, 22 Drawing Sheets

U.S. PATENT DOCUMENTS

| | | | | |
|---|---|---|---|---|
| 7,015,520 B1* | 3/2006 | Parks | ............................. | 257/246 |
| 7,385,734 B2* | 6/2008 | Chiu | ............................. | 358/483 |
| 2002/0074481 A1* | 6/2002 | McGrath et al. | ............ | 250/208.1 |
| 2003/0197857 A1* | 10/2003 | Yamashita | ................. | 356/237.2 |
| 2004/0017224 A1 | 1/2004 | Tumer et al. | | |
| 2005/0078339 A1* | 4/2005 | Hori | ............................. | 358/445 |
| 2005/0224842 A1* | 10/2005 | Toyama | ........................ | 257/225 |
| 2006/0022862 A1* | 2/2006 | Egawa et al. | ................. | 341/155 |
| 2006/0077277 A1* | 4/2006 | Kitaoka et al. | ................ | 348/312 |
| 6,426,238 B1* | 7/2002 | Morimoto | ....................... | 438/52 |
| 6,586,784 B1* | 7/2003 | Parks | ............................. | 257/236 |
| 6,654,112 B2* | 11/2003 | Noguchi et al. | ............ | 356/237.3 |
| 6,933,975 B2* | 8/2005 | Wen | ............................. | 348/312 |

OTHER PUBLICATIONS

De Marinis, M.: "Sensor Platform Design for Automotive Applications," 2003, Proceeding of the Euromicro Symposium on Digital System Design, p. 2.*

Horowitz, Paul, "*The Art of Electronics*," $2^{nd}$ Ed., (1989), Cambridge University Press, pp. 34-35.

Janesick, James R., "*Scientific Charge-Coupled Devices*," (2001), SPIE, p. 393.

Analog Devices, Inc., "*Analog Devices 20mW Power, 2.3V to 5.5V, 50MHz Complete DDS*," (2003).

* cited by examiner

APPARATUS FOR CONTINUOUS CLOCKING OF TDI SENSORS

This application is a continuation-in-part of currently pending U.S. patent application Ser. No. 10/992,063, "Continuous Clocking of TDI Sensors," filed Nov. 18, 2004, inventors David Lee Brown et al., which is incorporated herein by reference.

BACKGROUND OF THE INVENTION

1. Field of the Invention

The present invention relates generally to the field of electronic imaging, and more particularly to inspection of specimens such as semiconductor wafers and photomasks using TDI (Time Delay Integration) sensors.

2. Description of the Related Art

Many optical systems have the ability to inspect or image features on the surface of a specimen, such as inspecting defects on a semiconductor wafer or photomask. Certain advanced semiconductor defect inspection systems can detect defects on the order of 30 nm in size during a full inspection of a 300 mm diameter wafer. Such defects are seven orders of magnitude smaller than the wafer itself.

These types of optical systems may employ sophisticated sensors, including but not limited to TDI sensors. TDI sensors exhibit increased throughput for wafer inspection systems and photomask inspection systems over other types of sensors by more than one order of magnitude. FIG. 1 illustrates a typical TDI sensor. From FIG. 1, an array of pixels make up the imaging region 101. A current state-of-the-art TDI sensor according to FIG. 1 may contain a 256×2048 array or larger image area. In a typical arrangement, a lamp, laser beam, or other bright illumination source illuminates the semiconductor wafer surface. The wafer surface reflects light onto the TDI sensor, and at the points where light strikes the sensor the sensor may generate photoelectrons.

The TDI sensor typically scans a magnified image of the wafer. The sensor continuously accumulates charge as it scans the wafer, and the sensor transfers charge along a column of pixels 102 at generally the same rate at which the sensor moves with respect to the wafer image. In the orientation of FIG. 1, the sensor moves charge vertically from one pixel to the next.

TDI sensors typically contain channel stops 103, represented by the solid vertical lines in FIG. 1. These channel stops 103 prevent the movement of electrons or charge from one column to another within the imaging region 101. Electron movement is generally inhibited until the electrons reach the serial registers 104 at the edge of the sensor, where the serial registers are represented by gray rows of pixels.

When charge reaches the last pixel in a column, the charge moves to the serial register 104. The serial register 104 transfers the charge horizontally, pixel by pixel, until the charge reaches read-out stage and read-out amplifier or amplifiers 105. A transfer gate 106 or similar structure typically controls charge movement between the imaging region 101 and the serial register 104.

Certain TDI sensors have only one read-out amplifier 105, typically positioned at the end of the serial register 104. Other TDI sensors, such as the one shown in FIG. 1, have multiple read-out amplifiers 105 to decrease the time required to read the contents of the pixels in the serial register.

For several reasons, previous TDI sensors exhibit less than optimal functionality. Prior TDI sensors employ a method called "burst clocking," whereby the TDI sensor may transfer a charge from pixel to pixel, where the graph of voltage changes sharply from positive to negative and back again. Previous TDI sensors employing burst clocking do not exhibit optimal speed in transferring the pixel charge, and tend to be highly sensitive to timing jitter. Such sensors can exhibit high levels of power dissipation and have a relatively low charge transfer efficiency. Further, previous TDI sensors tend to exhibit high dispersion of clock waveforms, low modulation transfer functions, and a higher probability of electromigration. Further, TDI sensors employing burst clocking generally do not perform well when environmental conditions or subtle operating changes occur.

When implementing a TDI sensing design, certain issues may arise, most notably feed through time, charge transference, timing jitter generated by on-board electronics, and an imperfect ground return path within a high speed sensor implementation, each introducing certain errors to the signals generated. Smooth operation is desirable in CCD or TDI sensing hardware implementations.

It would therefore be beneficial to provide an implementation of relatively smoothly operating sensor for use in conjunction with semiconductor wafer or photomask inspections that overcome the foregoing drawbacks present in previously known electronic imaging systems. Further, it would be beneficial to provide a sensing implementation and overall optical inspection system design having improved functionality over devices exhibiting the negative aspects described herein.

SUMMARY OF THE INVENTION

According to one aspect of the present design, there is provided a sensing apparatus, comprising a programmed processor programmed with logic configured to provide a set of values representing a plurality of out of phase variable signals, such as sinusoidal or trapezoidal signals. The design further comprises a plurality of conversion elements, such as digital to analog conversion elements, the plurality of conversion elements configured to receive the set of values, convert the set of values into a converted set of values having a different format, and transmit the converted set of values to a sensor comprising multiple inputs configured to receive the converted set of values. The converted set of signals received from the plurality of conversion elements cause the sensor to transfer charges in the sensor toward an end of the sensor.

According to another aspect of the present design, there is provided a sensing system, comprising a field programmable gate array (FPGA), a plurality of signal digital to analog converters (DACs) connected to the FPGA, the plurality of signal DACs receiving variable signals from the FPGA, wherein each variable signal received from the FPGA is out of phase from other variable signals, and a sensor comprising multiple inputs configured to receive variable signals from the plurality of signal DACs. The variable signals from the plurality of signal DACs cause the sensor to transfer charges in the sensor toward an end of the sensor.

These and other advantages of the present invention will become apparent to those skilled in the art from the following detailed description of the invention and the accompanying drawings.

DESCRIPTION OF THE DRAWINGS

The present invention is illustrated by way of example, and not by way of limitation, in the figures of the accompanying drawings in which.

DETAILED DESCRIPTION OF THE INVENTION

According to the present invention, there is provided a TDI sensing implementation, potentially for use in an inspection system that employs continuous clocking to transfer charge between pixels. The present design may offer improvements over previously known TDI sensor designs.

Burst Clocking

Figure 1:
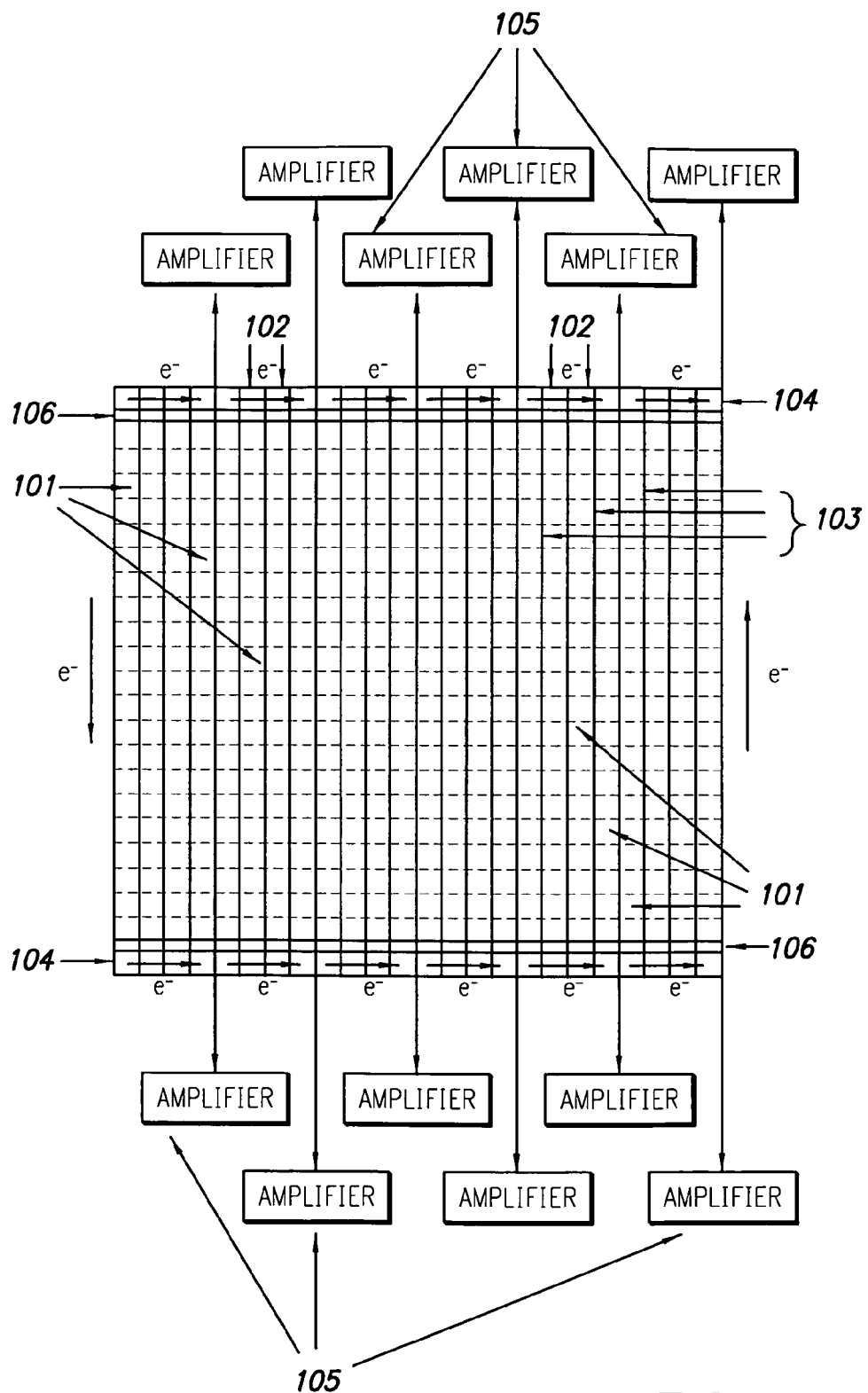
FIG. 1 illustrates construction of a typical high-speed multi-channel TDI sensor.
Figure 2:
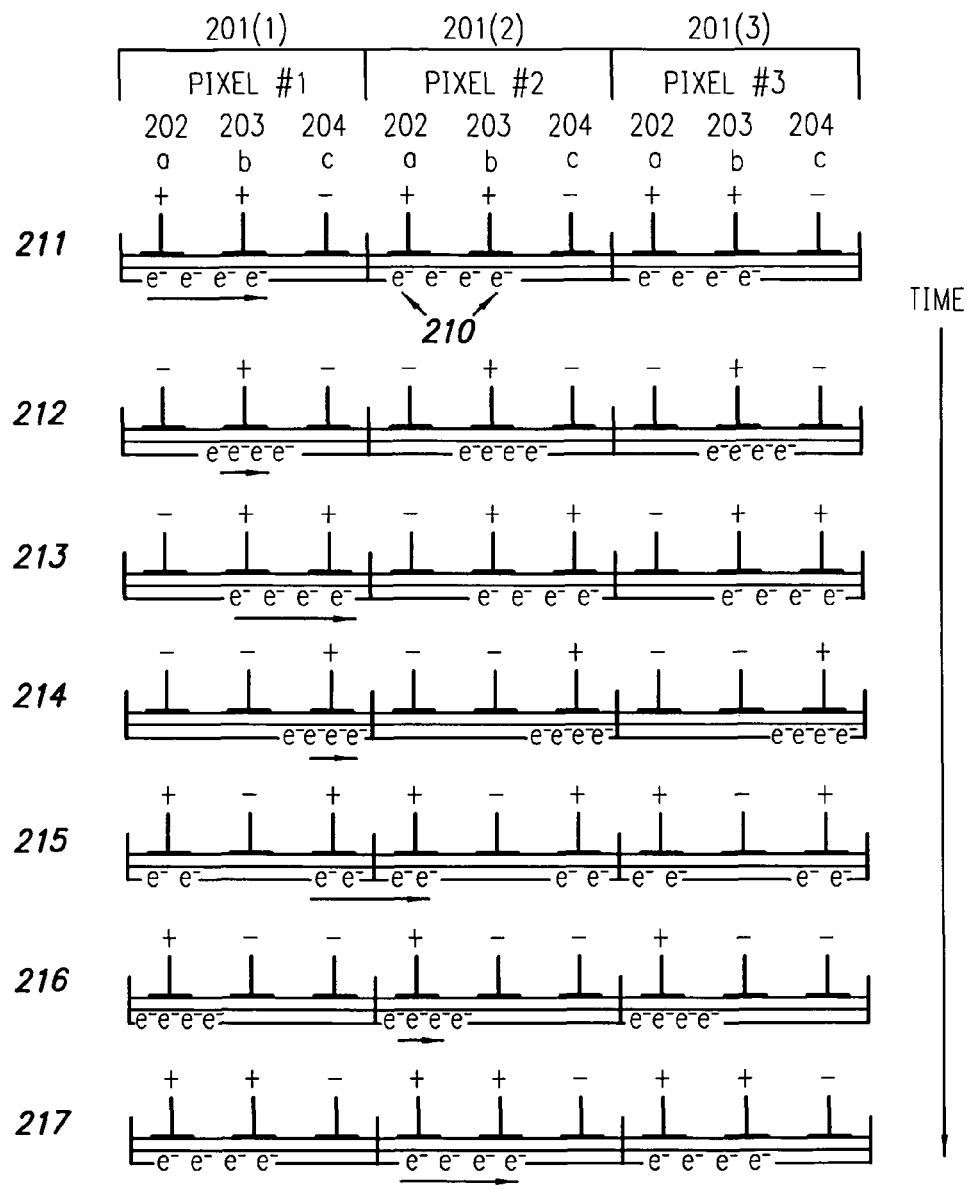
FIG. 2 shows three neighboring pixels in a column, each pixel comprising three polysilicon gates, with the pixels in seven different states.

FIG. 2 illustrates how previous TDI sensors move charge from one pixel to another within a column of pixels. FIG. 2 shows three neighboring pixels 201(1), 201(2), and 201(3) within a single column. The term "column" relating to FIG. 2 serves to explain how the charge moves vertically from pixel to pixel in FIG. 1. Each pixel comprises three polysilicon gates, labeled a 202, b 203, and c 204. This three-gate structure enables the charge to move in the desired direction.

FIG. 2 illustrates three pixels, each with three gates, in seven different states 211-217. In this example, the initial state of the TDI sensor is state 211. The TDI sensor advances to states 212, 213, and so forth sequentially as time progresses. State 217 is essentially equal to state 211, except the charge has moved forward by one pixel. FIG. 2 illustrates a cycle through which the TDI sensor passes each time the sensor moves charge from one row of pixels to another. In each successive stage, the pixels move one increment from left to right. This process occurs simultaneously in all columns of the sensor.

In the first state 211, the system electronics have applied a positive voltage to the a gates 202 and b gates 203 and a negative voltage to the c gates 204. The a gates 202 and b gates 203 attract the photoelectrons 210, marked e-. The c gates 204 repel the photoelectrons 210. The photoelectrons are therefore concentrated over a relatively broad area near both the a gates 202 and the b gates 203.

To convert to the second state 212, the system electronics change the voltage on all a gates 202 from positive to negative. As a result, only the b gates 203 attract the photoelectrons. The a gates 202 and c gates 204 repel the photoelectrons. In each pixel, the b gates 203 at this point attract all the photoelectrons which had previously clustered around both the a gates 202 and b gates 203 during the first state 211. The electrons have begun their progression from left to right.

To convert to the third state 213, the system electronics change the voltage on all c gates 204 from negative to positive. At this point, both b gates 203 and c gates 204 attract the photoelectrons, while the a gates 202 continue to repel them. In each pixel, the charges which had previously been only located around the b gates 203 during state 212 have spread out through a larger area near both the b gates 203 and c gates 204. At this point, the electrons have moved forward by one gate.

To convert to the fourth state 214, the system electronics change the voltage on all b gates 203 from positive to negative. At this point, only the c gates 204 attract the photoelectrons. The photoelectrons which had previously spread out in the vicinity of both the b gates 203 and the c gates 204 at this point concentrate near the c gates 204.

To convert to the fifth state 215, the system electronics converts the voltage on all a gates 202 from negative to positive. At this point, since both the c gates 204 and the a gates 202 attract the photoelectrons, the photoelectrons can move another step from left to right. Rather than crowding around the c gates 204, the electrons can expand throughout the area defined by the neighboring c gates 204 and a gates 202. In moving toward the a gates 202, the photoelectrons begin to enter the next pixel.

To convert to the sixth state 216, the system electronics convert the voltage on all c gates 204 from positive to negative. The photoelectrons which had been broadly clustered around the c gate 204 from one pixel and the a gate 202 in the next pixel are drawn only to the a gate 202. All photoelectrons thereby advance into the next pixel.

To convert to the seventh state 217, the system electronics convert the voltage on all b gates 203 from negative to positive. The electrons which had concentrated around only the a gates 202 now spread out over the area defined by both the a gates 202 and the b gates 203. The seventh state 217 is equivalent to the first state 211, except that the photoelectrons have moved forward by precisely one pixel.

In this way, the charge moves from pixel to pixel at the same rate at which the TDI sensor is traveling over the surface of the wafer. For simplicity, the foregoing discussion ignores the fact that light reflected from the surface of the sample onto the TDI sensor continues to generate photoelectrons in each pixel of the TDI sensor while the charge is moving.

Figure 3:
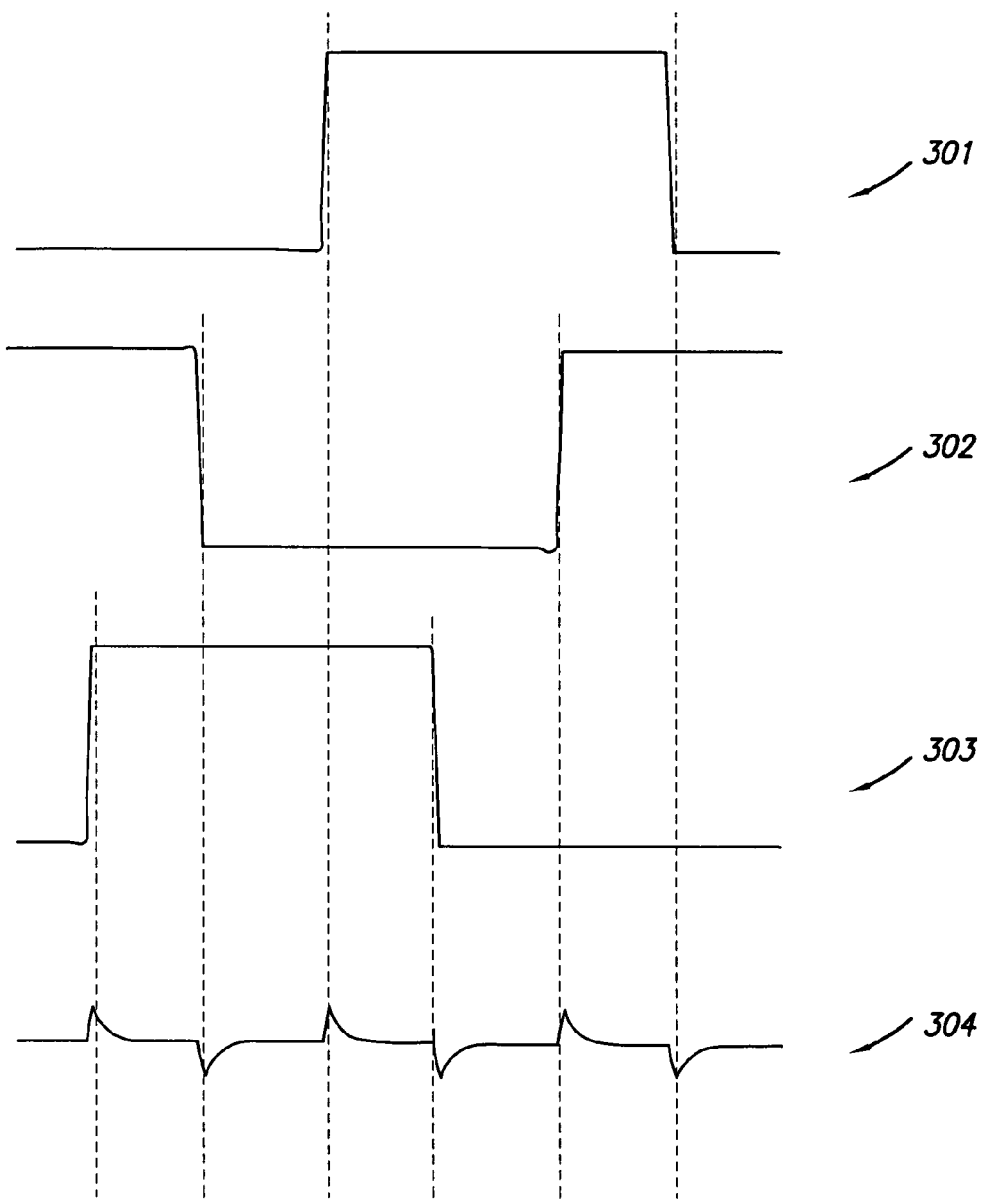
FIG. 3 represents graphs of voltage versus time for three gates, namely the a gates, b gates, and c gates, using square wave voltage applications, and a resulting voltage waveform that may appear on an imperfect ground return path.

FIG. 3 illustrates digital square waves by which the system electronics of previous TDI imaging systems change the voltage on the a gates 202, b gates 203, and c gates 204 to move the charge forward from one pixel to the next. The graph 301 illustrating the voltage on a gates 202 as a function of time shows how the voltage can move sharply from negative to positive, and then sharply from positive to negative at an appropriate moment, and completes one cycle while serial register gates are held relatively constant. This method is herein called "burst clocking," where burst clocking is a method by which the previous TDI sensor can transfer charge from pixel to pixel.

Graphs 302 and 303 in FIG. 3 represent voltage versus time on the b gates 203 and c gates 204 respectively. These graphs are temporally aligned with the graph 301 representing voltage versus time on the a gates 202. Taken together, graphs 301, 302, and 303 show shift in time between the digital square wave voltage patterns on the three gates. The residual voltage on an imperfect ground return path is also shown in graph 304, produced by the voltage changes on the a, b, and c gates. This time shift relationship facilitates moving the photoelectrons through the six step process of FIG. 2.

Moving charge using three gates per pixel enables the TDI sensor to move charge in either direction by adjusting the timing of the gates. To optimize throughput in a typical wafer or reticle inspection system, the TDI sensor may scan in one direction, stop a short time, and scan back in the opposite direction.

When the charge reaches the last pixel in a column, the charge has entered a serial register 104. The system electronics then move charge in a similar way, horizontally in the orientation shown in FIG. 2, until the charge reaches a read-out amplifier 105. The read-out amplifier 105 reads out the charge one pixel at a time. Bi-directional TDI sensors have been employed, where serial registers and rows of amplifiers may occupy both sides of the bi-directional TDI sensor.

Figure 4:
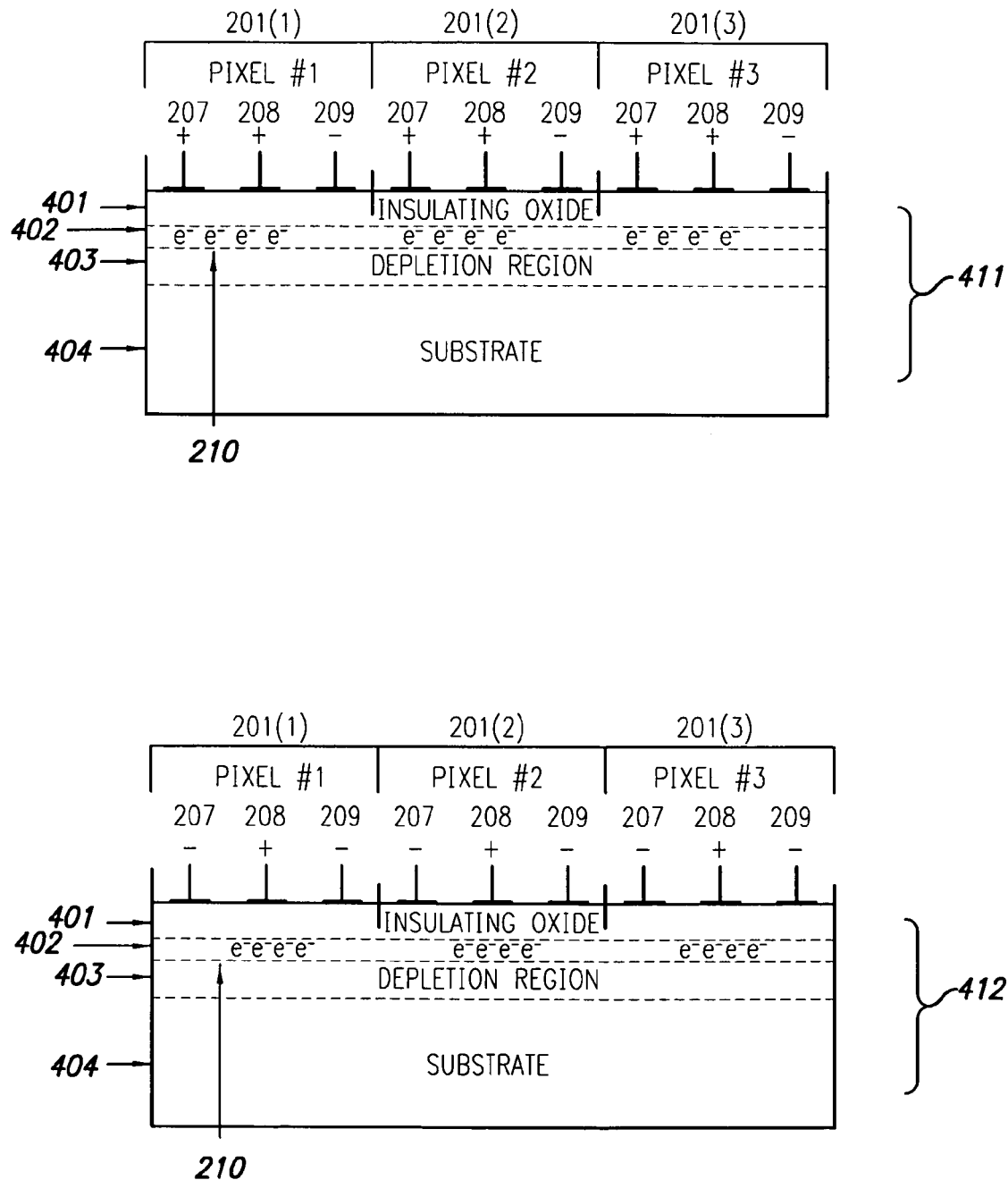
FIG. 4 illustrates two cross sections of a TDI sensor including three pixels, gates, an insulating layer beneath the gates, and a region of silicon or other suitable semiconductor material.

FIG. 4 shows the cross section of a TDI sensor, including three pixels 201, the a gates 207, b gates 208, and c gates 209, an insulating layer 401 such as silicon oxide beneath the gates, and a region 402 of silicon or other suitable semiconductor material beneath the insulating layer 401 where the photoelectrons 410 congregate near gates carrying a positive charge. The TDI sensor further includes a depletion region 403 of silicon where positive charge on the gates draws electrons and drives away positively charged holes, and the bulk of the silicon substrate 404.

FIG. 4 shows the TDI sensor in two states. The first state 411 where the a gates 207 and b gates 208 have a positive voltage and the c gates 209 have a negative voltage. The second state 412 differs from the first state 411 in that the voltage on the a gates 207 has switched from positive to negative.

TDI sensors can have one, two, three, four, or more gates per pixel. FIG. 4 shows a TDI sensor with three gates per pixel, common in many industrial applications. The TDI sensor has a structure resembling a capacitor with conducting polysilicon gates and bulk silicon on opposite sides of an oxide insulating layer. All the gates and the analog readout circuits on the TDI chip in this example share the same ground. In this arrangement, when the system electronics change the state of the sensor from the first state 411 to the second state 412 by switching the voltage on all a gates 207 from positive to negative using a square wave, the system electronics may inject a significant current into that capacitor. This current flows down the lines controlling the a gates 207 in every column of the sensor. As a result, a large displacement current flows through the capacitor and results in return current through the substrate to complete the circuit. The return current causes a spike of voltage noise 304. The current and the spike of voltage noise generally occur whenever the system electronics change the polarity of any gate.

This spike of voltage noise in the substrate can be problematic due to the sensitivity of the read-out amplifiers. The read-out amplifiers read signal voltages relative to the substrate voltage, and changes in the substrate voltage can create an error in the measurement. Signal voltages for each pixel can be on the order of a volt and voltage fluctuations can reach hundreds of millivolts due to the system electronics changing gate voltage by more than five volts into a high capacitance gate structure.

To meet sensitivity specifications at high speed, the TDI sensor needs to rapidly measure charge on each pixel with accuracy of the order of one millivolt. The TDI sensor may not be able to make such a measurement in the presence of the noise spikes which occur when the system electronics change the voltages on the gates. One way of addressing TDI sensor sensitivity has been to discontinue moving the charge from pixel to pixel within the columns of the TDI sensor (the vertical columns in FIG. 1) while the read-out amplifiers 105 read signals from the pixels in the serial register 104, the horizontal rows in FIG. 1.

The TDI sensor generally operates in a three part cycle. The first part moves the charge in the vertical columns from one pixel to another via the six-step process of FIG. 2. The second part awaits settling of the voltage fluctuations. The third part reads the contents of the pixels in the serial register 104. During the first two parts of this process, the readout amplifiers cannot operate. The readout amplifiers may need to wait until the two parts have completed to operate in a sufficiently noise-free environment that meets sensitivity requirements.

In earlier TDI sensors, this waiting time created fewer issues because the sensors typically included a single read-out amplifier 105 at the end of each serial register 104. The read-out amplifier 105 sequentially read the charge in several hundred pixels. The time required to advance the charge in each column by one pixel, or to execute the six-step process illustrated in FIG. 2, accounted for only a small percentage of the total operation time. Pausing the serial register operation 104 and read-out amplifier 105 while moving the charge and waiting for the noise to settle may provide a relatively minor speed loss.

However, recent generations of high-speed TDI sensor have many amplifiers 105 spaced at short intervals along the serial register which read the signals from many pixels in parallel. Under these circumstances, waiting can constitute a significant percentage of the total operating time.

Timing jitter introduces noise in the image produced by the TDI sensor because the digital waveform frequency components leak or feed through into the measurement signal. Some degree of clock cancellation can be obtained by using four phase clocking and timing the clock edges so that opposing pairs operate together, but the digital timing jitter effects can result in far from ideal improvements.

The modulation transfer function (MTF) is a measure of how accurately the sensor represents the contrast of an image. For a given spatial frequency, the MTF is a number between 0 and 1, defined as the difference between the maximum light intensity and the minimum light intensity, divided by the sum of the maximum light intensity and the minimum light intensity at that frequency:

$$MTF=(I_{max}-I_{min})/(I_{max}+I_{min}) \tag{1}$$

The primary limitation on the MTF of previous TDI sensors employing burst clocking is that the wafer image moves continuously with respect to the physical sensor, but the recorded image moves discontinuously from pixel to pixel across the sensor. The result is that any given photon reflected from the wafer or photomask may be subject to a small but significant misregistration on the sensor that, in extreme cases, could be as high as plus or minus one half pixel. The discrete movement of the charge across the sensor combined with the continuous movement of the image across the sensor can slightly blur the image and may result in a reduced MTF.

Charge Transfer Efficiency (CTE) is a measure of the ability of the sensor to move electrons from one storage region to the next during a given clock cycle, expressed as a ratio between the number of electrons actually moved to the next storage region and the number of electrons the sensor attempts to move as a ratio between 0.0 and 1.0. A CTE close to 1.0 indicates the ability to move charge efficiently over many transfers from the most distant collection region to the readout location. The transfer efficiency requirement for a sensor may be greater than 0.9999 per transfer.

If the application requires the device to operate at a different line rate, the sensor can have fundamental clock frequency increased or reduced to achieve the new operating requirements. In this instance, the harmonic component frequencies associated with any filtered waveforms are generally proportionally increased or reduced. The filter is generally not adjusted. In these circumstances a smaller or larger or number of harmonics can pass to the device, thereby changing the detailed shape of the waveforms in a poorly controlled way.

Continuous Clocking

The present design tends to reduce the electronic noise associated with the TDI sensor and enable a TDI sensor to operate with faster overall data rates and resolution. The present design controls the detailed shape of the voltage waveforms that advance the accumulated charge from gate to gate within the image area of the sensor to address voltage noise in the sensor substrate. The present design also advances the charges in the image area using a voltage that changes gradually in a well controlled manner and with a sufficiently precise relationship to all other image area gate voltages.

Figure 11:
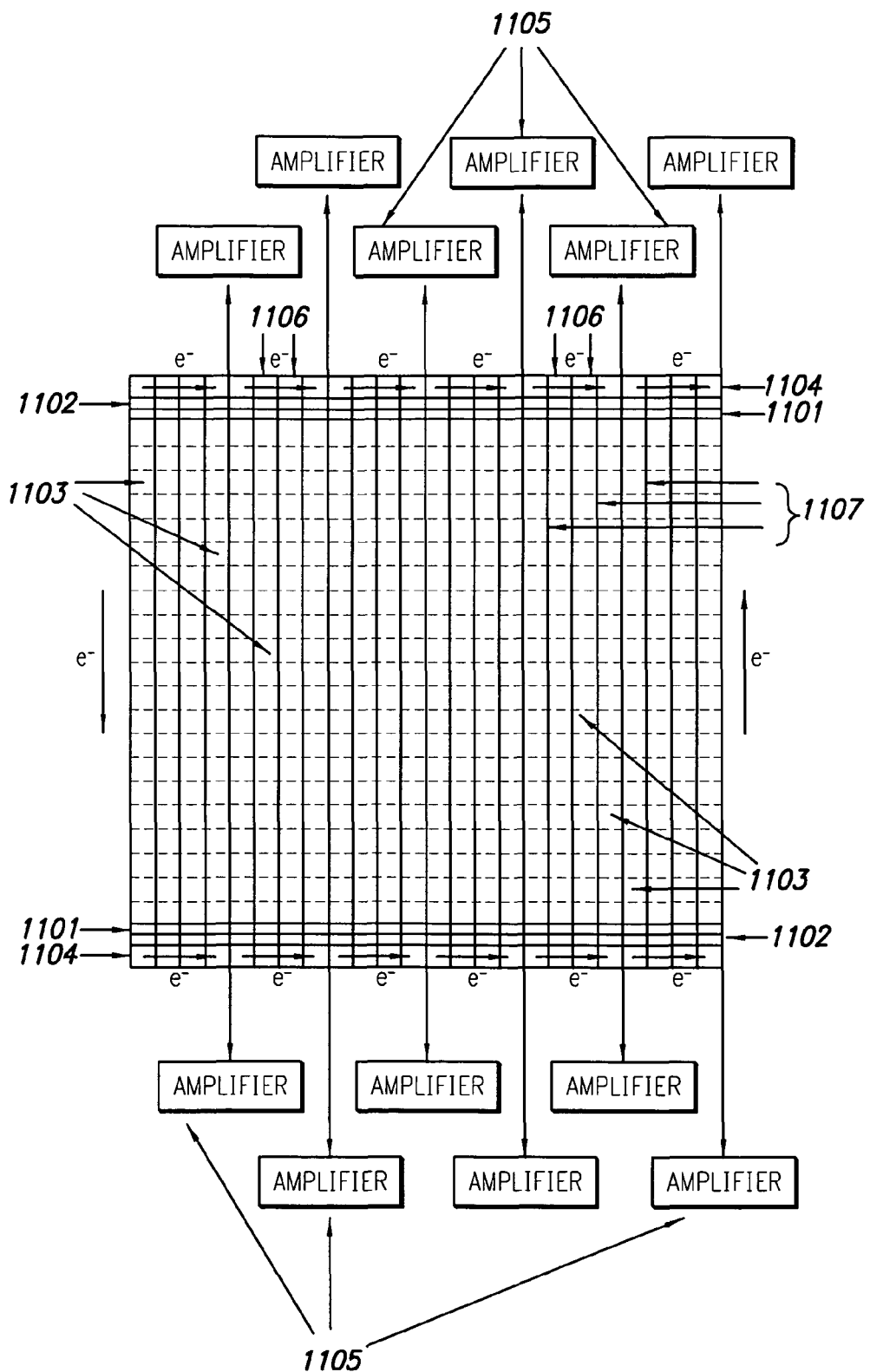
FIG. 11 includes an additional row of buffer gates interposed between the vertical image area and the transfer gates.

The image area consists of all the pixels 1103 in FIG. 11, excluding the serial register 1104, the transfer gate 1102, and the buffer gate 1101. Rather than changing the voltages on the gates using a nearly square wave as in FIG. 3, the present design changes the voltages on the gates in the image area with sinusoidally or nearly sinusoidally varying voltage waveforms as in FIG. 5. From FIG. 5, the sinusoidal voltage 501 on the a gates, the sinusoidal voltage 502 on the b gates, and the sinusoidal voltage 503 on the c gates are 120 degrees out of phase. The charge moves from gate to gate and from pixel to pixel generally in the manner shown in FIG. 2, except that voltage waveforms tend to be sinusoidal, relatively smooth, and the charge collection and charge movement is substantially continuous.

Figure 5:
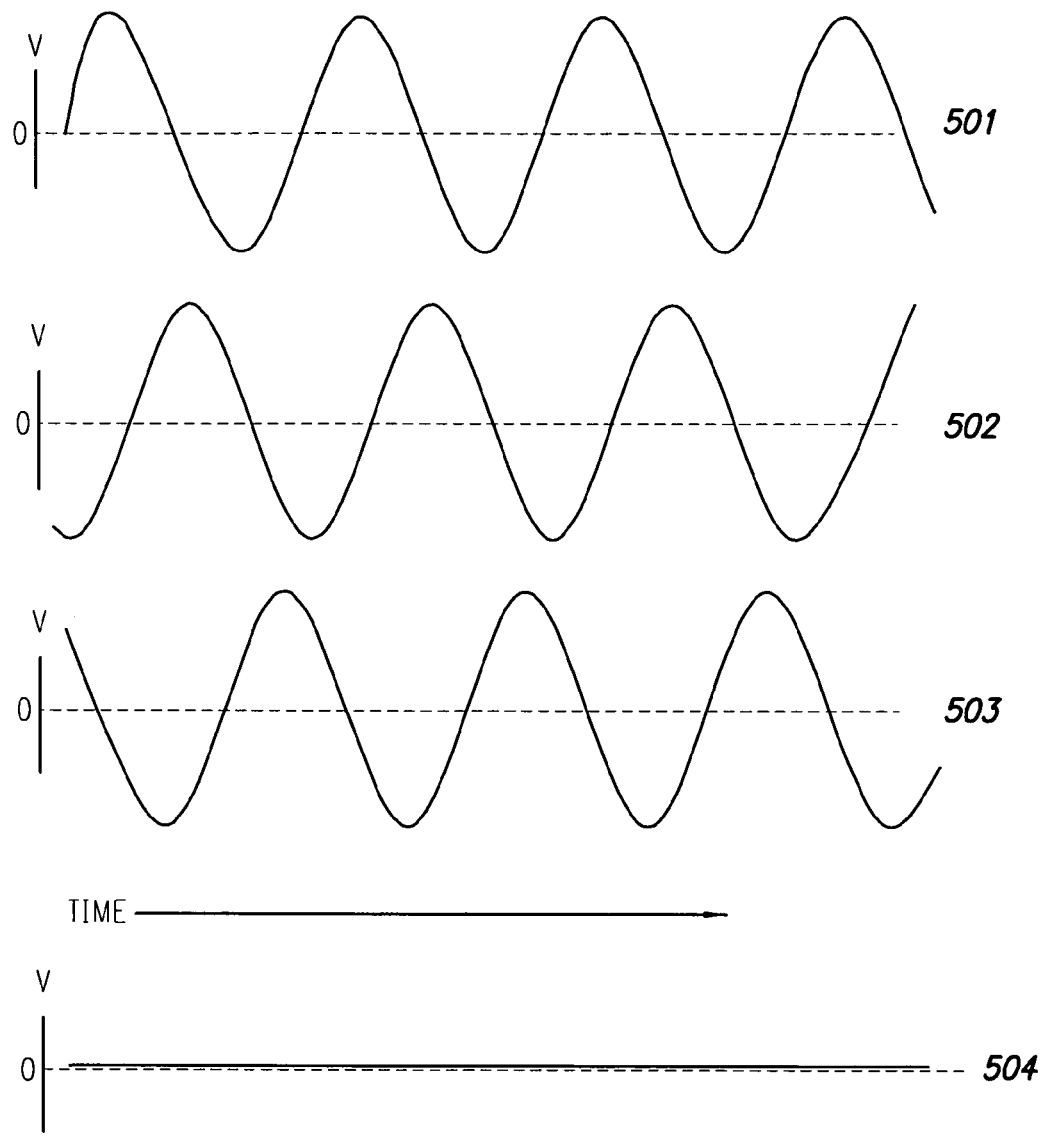
FIG. 5 represents the sinusoidal voltages applied to the a gates, b gates, and c gates and the resultant de minimis voltage sum.

FIG. 5 illustrates gate voltage waveforms for a TDI sensor with three gates per pixel in which the phases of the waveforms corresponding to the gates are shifted by plus or minus 120 degrees compared to adjacent phases. The present design may also apply to TDI sensors with two gates per pixel, where the phases of the two voltage waveforms corresponding to the gates may be shifted by 180 degrees compared to adjacent phases. The design may also apply to TDI sensors having four or more gates per pixel, where in the case of four or more gates per pixel the phases of the four voltage waveforms corresponding to the gates may be shifted by plus or minus 90 degrees compared to adjacent phases, and so forth. The present design may apply to TDI sensors wherein adjacent phases of the voltage waveforms are shifted by a number of degrees equal to 360 degrees divided by the number of gates.

The present design may be employed in TDI sensors having serial registers on one side, as well as for TDI or frame imaging sensors having serial registers on two sides. The present design may be used in TDI sensors having one readout amplifier per side, and may be advantageous for TDI sensors having multiple readout amplifiers per side that require high speed operation with optimum signal-to-noise ratios.

The present design generally controls the voltage continuously over time rather than generating one of two voltage states, high and low. Similarly useful results may be achievable using waveforms having various well-controlled shapes, such as sawtooth or piecewise linear patterns. Voltage waveforms may be digitally synthesized, including composite waveforms.

The conventional method for wave shaping TDI gate voltages is to low-pass-filter square waveforms generated with digital electronics. The sensor may also perform low-pass filtering of drive signals, where such low-pass filtering is location dependent within the device. However, the frequency-domain filtering of a square-wave signal is not optimal. Analog filters can transmit higher frequency components than desired and may distort the signal in undesirable ways. Further, the filter design typically determines the waveform shapes generated by low-pass filtering in advance, and these shapes generally cannot be controlled in a flexible manner during device operation.

The present design may synthesize the precise desired continuous waveform and amplify the shaped waveform using analog amplifiers to produce negligible high-frequency components at the output of the synthesizer. The original synthesis circuitry may be digital, but can exhibit low noise characteristics and be well isolated using bypass capacitors and other appropriate electrical methods. Since none of the digital waveforms need to be amplified and passed to the sensor, isolation at this stage can be beneficial. The fundamental frequency of the digital synthesis stage can also be designed to optimize the isolation to prevent asynchronous signals from being generated that could increase the noise environment for sensor readout electronics. Synthesis circuitry can operate at a higher fundamental frequency than the TDI waveforms, enabling effective filtering in the configuration shown.

Transferring charge using a sinusoidal voltage wave rather than a square voltage wave generally requires lower peak currents to control the gates. As a result, the peak displacement currents flowing in the substrate is much lower, providing lower voltage fluctuations in the substrate and higher measurement sensitivity.

The shape and amplitude of sinusoidal voltage waveforms may be configured so that the sum 504 of the voltages on the a gates, the b gates, and the c gates is zero or near zero. Under these circumstances, the voltage waveforms generate a net substrate current of nearly zero, the total voltage noise in the substrate tends to be significantly lower, and the signal-to-noise ratio of the sensor can be higher. Additional optimization to compensate for capacitance differences between phases can further reduce net return current. Because the capacitance of the TDI gates for each phase is often not identical and the induced currents tend to be proportional to capacitance, the voltages of the waveforms may be selected such that the resulting currents generally cancel locally within the substrate. This current cancellation can reduce the total voltage noise in the substrate caused by moving charge from pixel to pixel and may reduce or eliminate the requirement of waiting for the substrate voltage fluctuations to settle before reading the contents of the pixels in the serial register 1104.

The readout amplifiers may be operated and charge in the image area transferred simultaneously at high speed without degradation to the noise performance. The low levels of voltage fluctuations in the substrate caused by the sinusoidal voltage waves enable the system to read the contents of the pixels in the serial register with sufficient sensitivity when the sensor is transferring charge in the image area. The readout amplifiers may operate while continuously moving the charge in the image area from one pixel to another. The peak line rate, or line transfer time, for the sinusoidal voltage waves is generally slower than the line transfer time of the square voltage waves used in burst clocking. The frequency components of the square waves are thus higher than the sine wave. In this environment, the overall data rate of the sensor using sinusoidal waveforms may increase despite the slower instantaneous line rate because of the lower voltage noise may be at a level sufficient to allow the read-out amplifiers to operate in a near-continuous manner.

Figure 13:
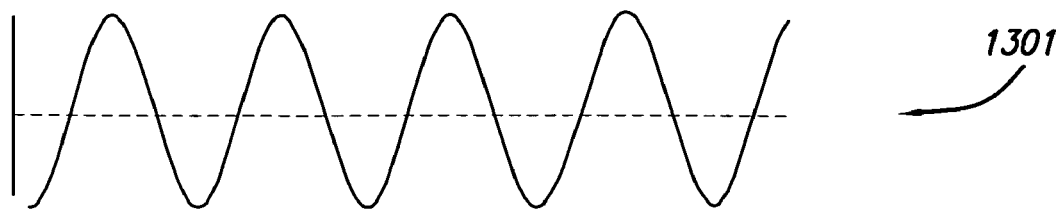
FIG. 13 shows the voltage waveforms that may be applied to the last image storage gate, buffer gate and the digital square voltage waveform that may be applied to the transfer and serial register gates.
Figure 13:
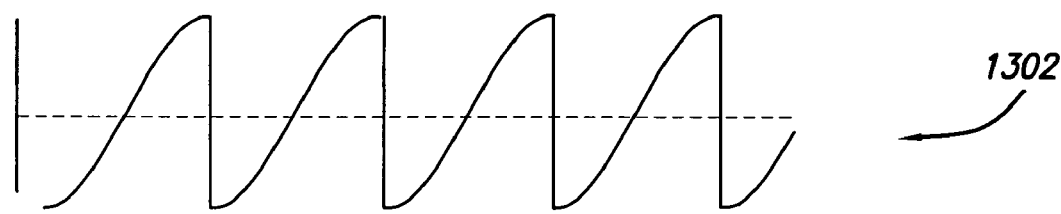
Figure 13:
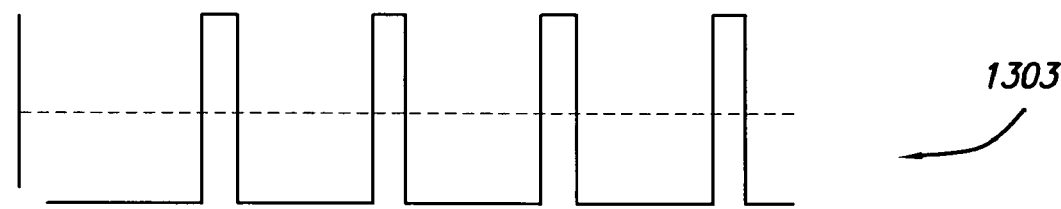
Figure 13:
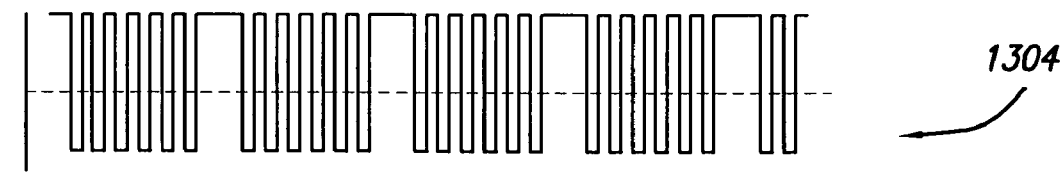

Operation of the readout amplifiers and the transfer of charge within the serial registers cease during time needed to transfer charge from the transfer gate 1102 to the serial register 1104 as shown in FIG. 11. The waveform 1303 for the transfer gate and for one phase of the serial register 1304 are shown in FIG. 13. The readout amplifiers of the sensor operate continuously except when the sensor loads charge from the image area buffer into the serial register. The sensor image area gates 1301 generally operate continuously with the possible exception of the buffer gates 1302.

Since the sinusoidal voltage waveforms are generally smoother than the square voltage waveforms and the resulting feed through currents cancel one another, voltage fluctuations due to timing jitter errors tend to be small. Furthermore, near-sinusoidal voltage waveforms tend to contain fewer high frequency components. Such high frequency components tend to be limited to a fundamental frequency, or a fundamental frequency plus a slight amount of added harmonics. The resultant high frequency components tend to exist within a limited, well-controlled bandwidth. The noise levels in all readout amplifiers remain substantially equal in character and degree.

The peak currents needed to generate a sinusoidal voltage waveform can be relatively low, and the cancellation effects can greatly reduce the power dissipation in the ground return path. The resultant lower power dissipation within the TDI substrate can potentially increase the signal-to-noise ratio compared to square-wave or burst clocking. The relatively lower chip temperature tends to substantially reduce the "dark" current, contributing to lower noise levels within the TDI sensor.

The sinusoidal voltage waveform moves charge from gate to gate and from pixel to pixel more continuously than the square voltage wave. The movement of charge across the sensor more closely resembles the continuous physical movement of the sensor relative to the semiconductor wafer or photomask. As a result, the modulation transfer function tends to be higher. The sensor tends to add fewer spurious signal photoelectrons to dark areas of the image and lose fewer signal photoelectrons from bright areas of the image. Any given photon reflected from the wafer or photomask remains registered on the sensor to an area typically much less than one pixel.

With sinusoidal voltage waves, the TDI sensor may also be less vulnerable to electromigration effects caused by high peak currents and thermal stress.

Digital synthesis of the TDI drive signals enables alteration and optimization of the detailed waveforms for each sensor and adjustments depending on operating conditions or application. Different operating speeds may be employed, and digital synthesis allows virtually continuous adjustment of the waveform shape to retain optimum performance throughout the operating range. The design also allows performance data for each sensor and board combination to be measured and to calibrate out nonlinearities and other residual effects.

Use of synthesized waveforms enables rapid changing of signal frequency content during device operation. For example, the buffer gate may have a relatively slow and smooth partial sine waveform for a period of time before reverting to a fast sharp-edged waveform.

Figure 15:
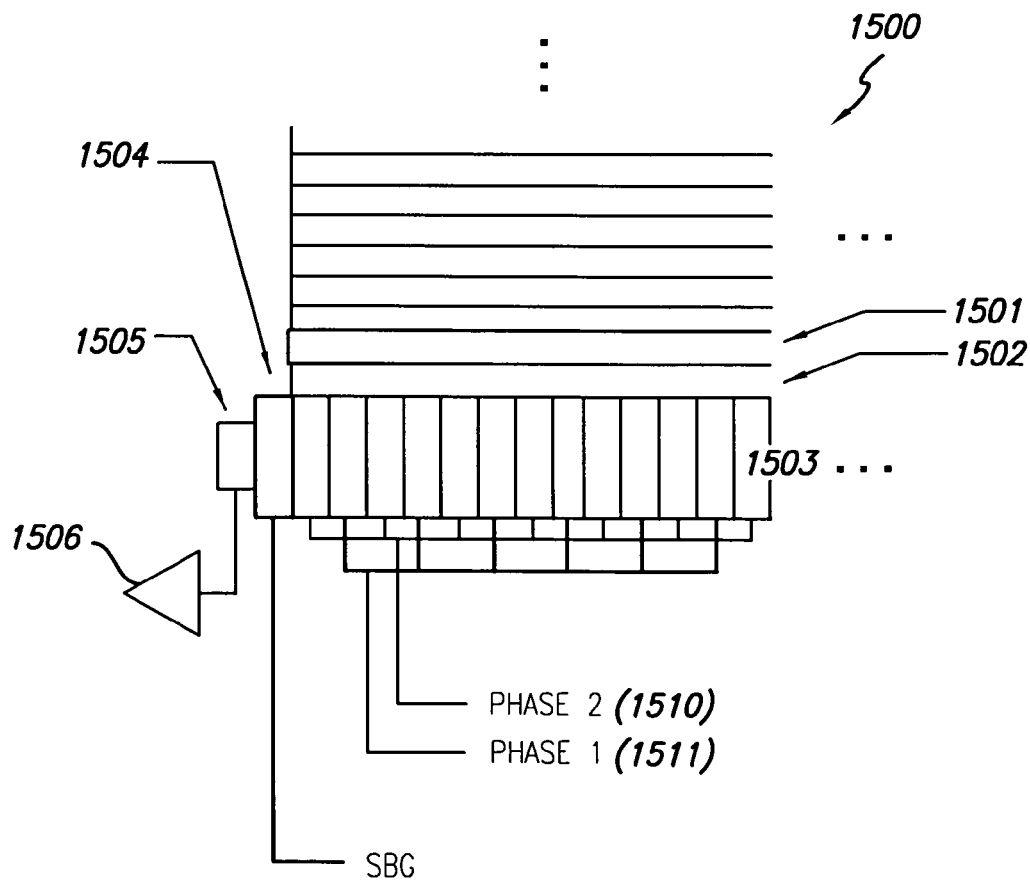
FIG. 15 is the serial output region of a sensor including a buffer gate, transfer gate, serial register, serial buffer gate, floating diffusion implant, and output amplifier stage.

A similar arrangement for clocking the imaging area can also be used to operate the serial registers. FIG. 15 illustrates a TDI sensor design with both a buffer gate in the image area 1501 and a serial buffer gate 1504 in the serial register area.

Waveform Generation

Figure 6:
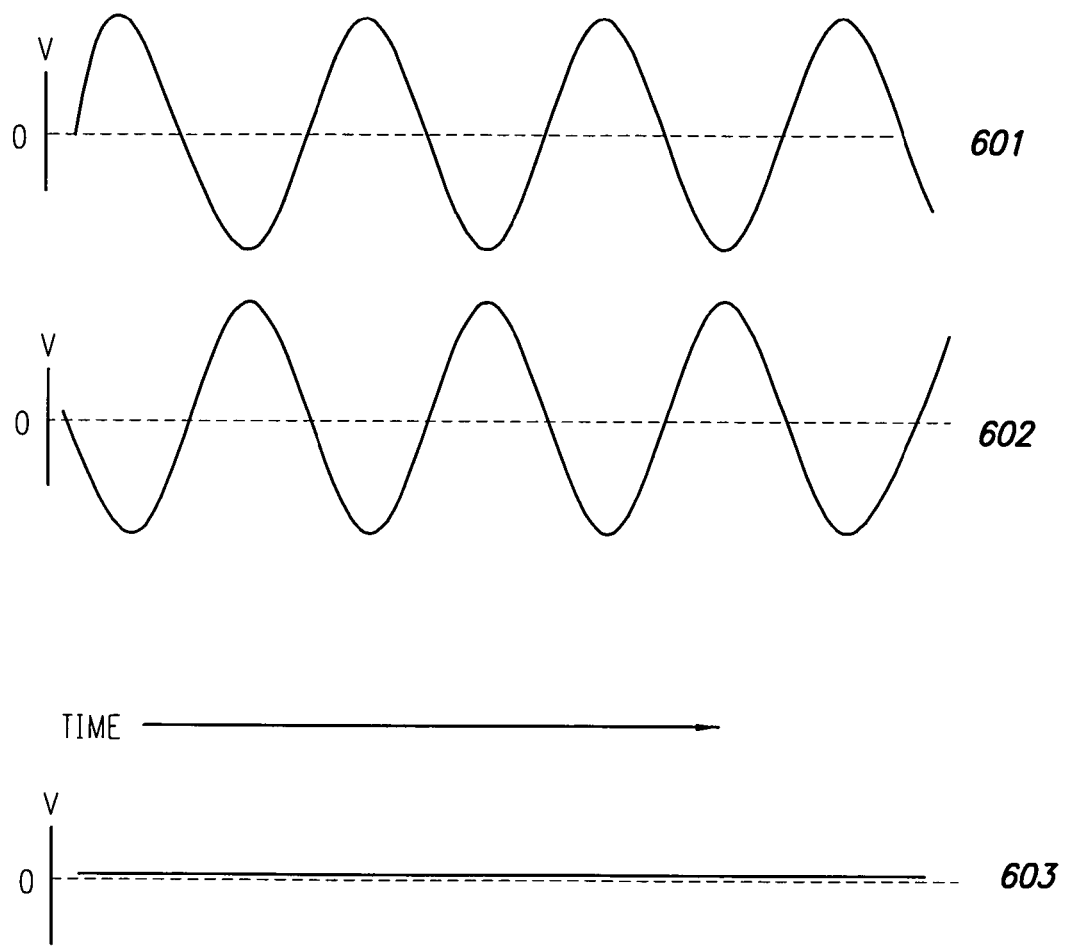
FIG. 6 shows sinusoidal voltage waveforms for a TDI sensor with two gates per pixel.
Figure 7:
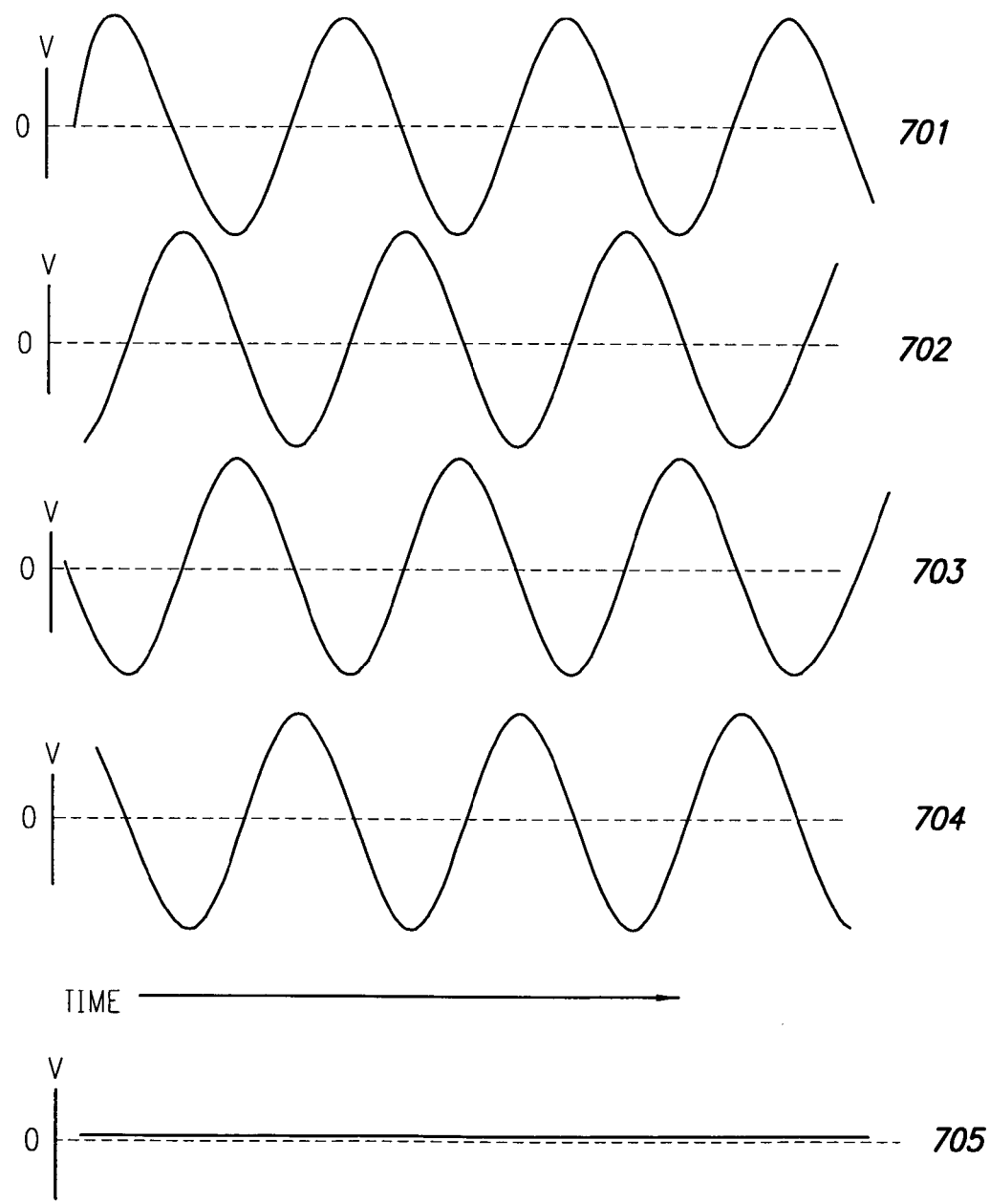
FIG. 7 represents sinusoidal voltage waveforms for a TDI sensor having four gates per pixel.

FIG. 6 shows the sinusoidal voltage waveforms for a TDI sensor with two gates per pixel. The sinusoidal voltages on the a gates in graph 601 and the sinusoidal voltages on the b gates in graph 602 are approximately 180 degrees out of phase. The sensor clock feedthrough is lowest when the ground return current induced by the combined voltage waveforms in graph 603 on the a and b gates is zero. FIG. 7 shows the sinusoidal voltage waveforms for a TDI sensor having four gates per pixel. The sinusoidal voltages on the a gates is shown in graph 701, the b gates in graph 702, the c gates in graph 703, and the d gates in graph 704 are 90 degrees out of phase with voltages of adjacent gates. For sinusoidal voltages the ideal sensor delivers the highest signal-to-noise ratio when the sum of the voltage waveforms on all four gates is zero at all times, such as is shown in graph 905. The slightly different capacitance of each gate and the non-linearities of the physical device may result in small deviations from the ideal case. These deviations can be compensated by selecting amplitude for each phase and/or pre-distorting the drive waveforms based on predictions or device measurement results. The corrections allow minimum clock feed through even in the presence of non-ideal conditions.

Figure 8:
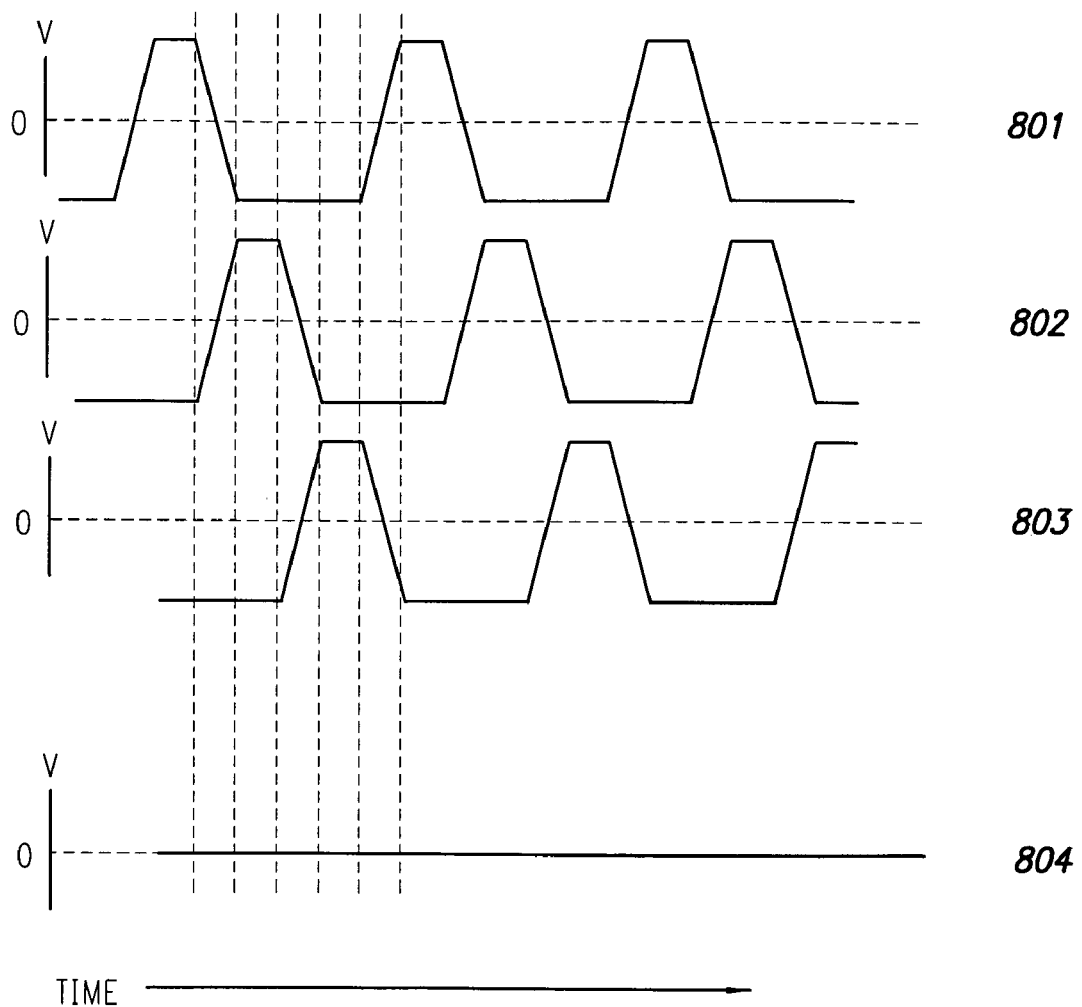
FIG. 8 shows addressing diminished storage capacity by transferring charge from each gate using trapezoidal voltage waveforms.

In the event each pixel cannot store the fully rated capacity of electrons, or in other words exhibits diminished storage capacity, the system may increase the amplitude of the sinusoidal voltage waveforms above the level required for square-wave burst-clocking. An alternate way to address diminished storage capacity is to transfer the charge from each gate using trapezoidal voltage waveforms, such as those shown in FIG. 8. In FIG. 8, the trapezoidal voltages on the a gates, the b gates, and the c gates, graphs 801, 802, and 803, respectively, are 120 degrees out of phase and apply to a TDI sensor with three gates per pixel. The system may minimize substrate noise by arranging the trapezoidal voltage waveforms so that the sum of the slopes of the voltage waveforms on the a gates, the b gates, and the c gates is zero. In each instant one of two conditions is satisfied in order to produce minimum ground path return current. For the first condition two of the three gates operate with opposite voltage swing, while the third gate has fixed voltage in time. For the second condition all gates have fixed voltage in time.

Figure 9:
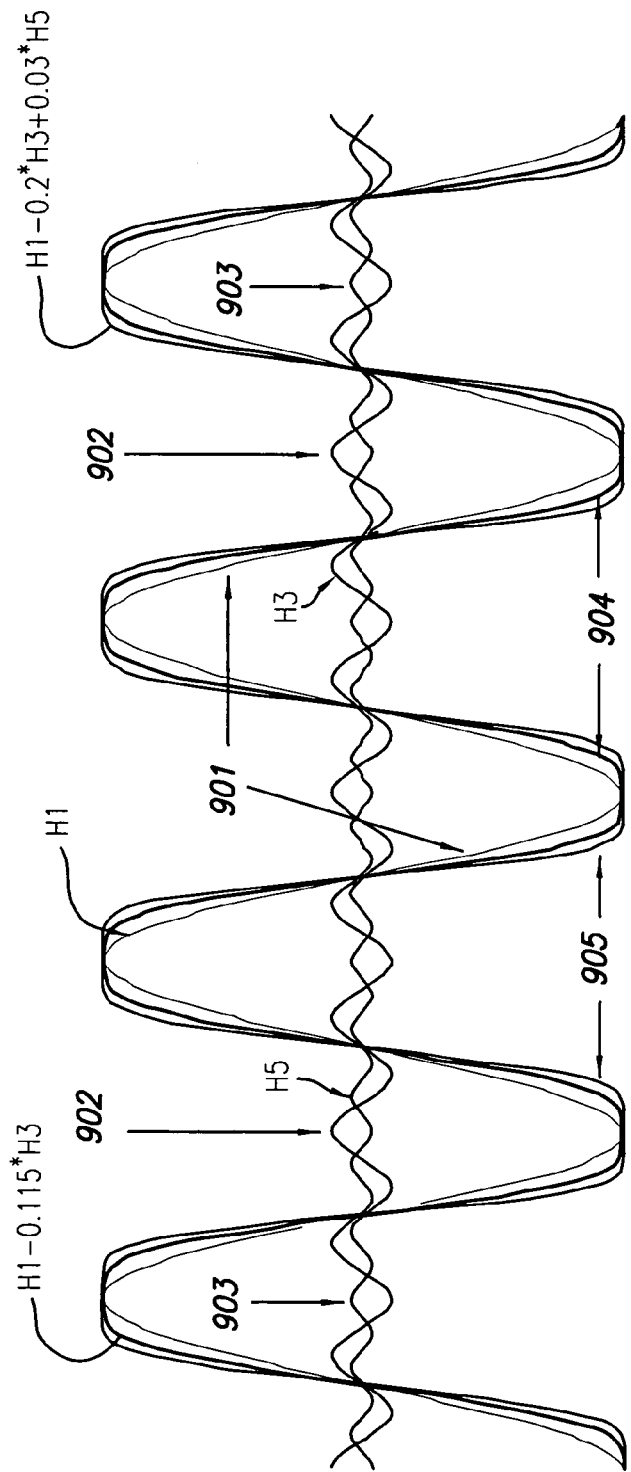
FIG. 9 is "flattening" the tops and bottoms of the fundamental sinusoidal waveforms by creating a composite waveform.

Yet another way to address diminished storage capacity is to "flatten" the tops of the fundamental sinusoidal voltage waveforms operating at the line rate frequency by mixing in small amounts of odd harmonics. FIG. 9 demonstrates "flattening" the tops and bottoms of the fundamental sinusoidal waveforms 901 by creating a composite waveform, or by adding small amounts of the fundamental frequency's $3^{rd}$ 902 and $5^{th}$ 903 harmonics to the fundamental frequency.

The first composite waveform 904 is the waveform resulting from subtracting the $3^{rd}$ harmonic with 11.5% of the amplitude of the fundamental frequency from the fundamental frequency itself. The waveform 904 flattens out at the top and bottom.

The second composite waveform 905 is the waveform provided by adding a $3^{rd}$ harmonic with 20% of the amplitude of the fundamental frequency to the fundamental frequency, and subsequently adding a $5^{th}$ harmonic with 3% of the amplitude of the fundamental frequency. The top and bottom of this composite waveform 905 flatten out even more than those of the previous composite waveform 904.

Figure 10:
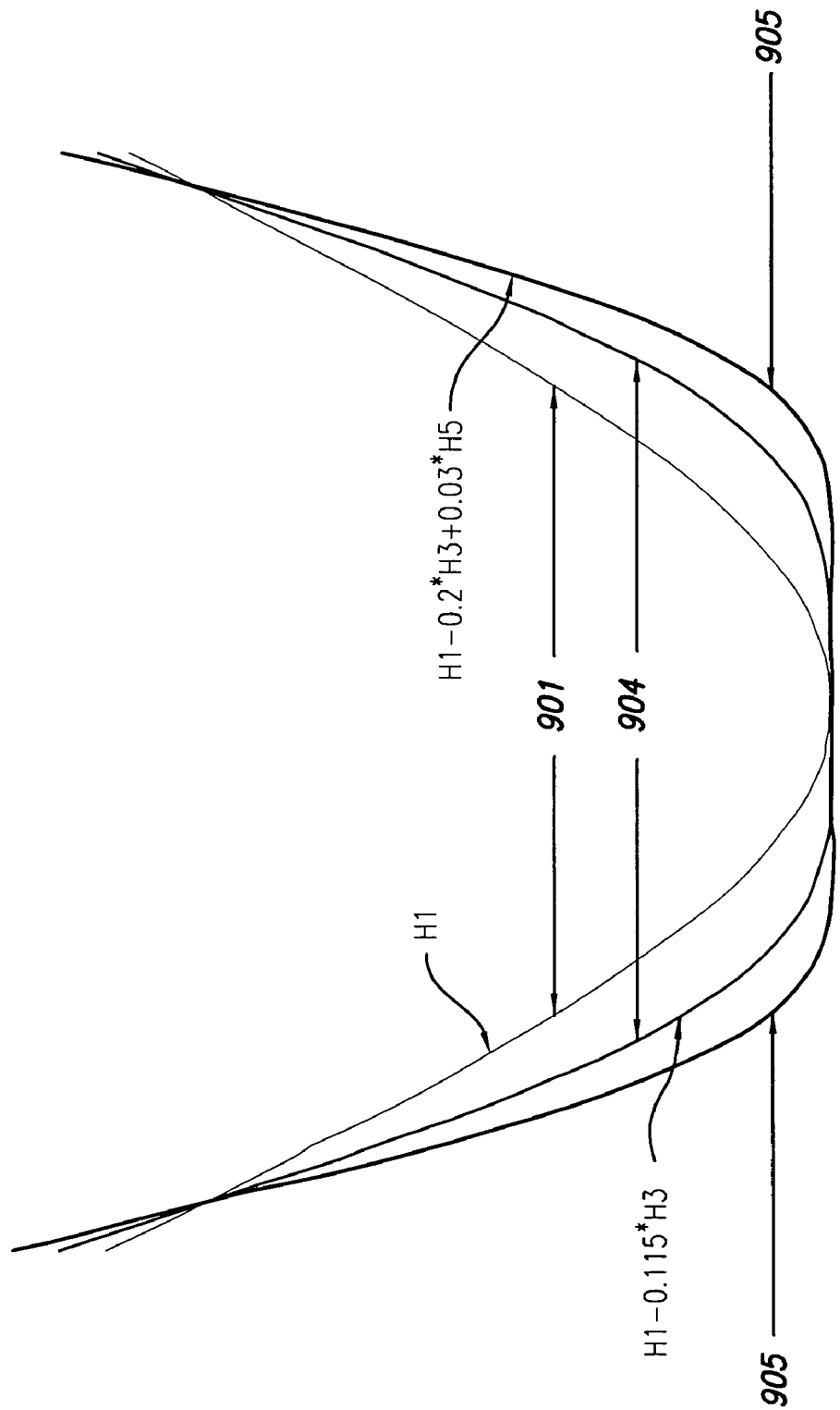
FIG. 10 illustrates enlarged views of the fundamental frequency, the first composite waveform, and the second composite waveform.

FIG. 10 shows enlarged views of the fundamental frequency 901, the first composite waveform 904, and the second composite waveform 905. The composite waveforms 904 and 905 can provide a greater storage capacity per pixel than the fundamental waveforms while tending to rise and fall more slowly than the square waves from FIG. 3 and subsequently can create less voltage noise in the substrate.

Difficulties may be encountered when arranging or providing composite waveforms such as waveforms 904 and 905 such that the net ground return current is zero. Composite waveforms may be arranged so the sum of slopes of the contributions from the fundamentals is zero or de minimis, but the sum of the contributions from the $3^{rd}$ harmonic components of each phase does not cancel, and in fact adds, and therefore generates net displacement currents in the substrate. Displacement currents induced this way are still relatively small because the amplitude of the harmonic waveforms is low. Also, since displacement currents tend to create regular and predictable voltage noise, the system can more easily compensate for this voltage fluctuation at the read-out amplifier by synthesizing the inverse of the feedthrough and canceling the effect. Alternately, the system may be configured to not generate a $3^{rd}$ harmonic component. In a three gate per pixel sensor, the system can use a $5^{th}$ harmonic to flatten the sinusoidal waveform. The return currents from the $5^{th}$ harmonic components tend to both flatten the waveform and cancel when properly phased.

The TDI sensor may include a row of gates 1101 interposed between the vertical image area and the transfer gates 1102, as shown in FIG. 11. Structurally, each buffer gate in the row of buffer gates 1101 may be similar to the three gates comprising a pixel in the vertical image area 1103 of the TDI sensor. However, the system drives the buffer gates 1101 in a different manner to render them compatible with both the continuous clocking of the input side (the vertical image area 1103) and the discontinuous clocking on their output side (the transfer gate 1102 and the horizontal serial register, 1104).

FIG. 13 shows a voltage waveform 1302 that may be applied to the buffer gates 1101. For the majority of each clock cycle, the voltage on a buffer gate slowly increases to a peak value, resembling the waveform transmitted over the pixels in the image area 1301, where the charge moves by continuous clocking. The charge transfers from the final pixel of the vertical image area 1103 into a buffer gate 1101 at a similar rate at which the charge has generally moved from gate to gate within the vertical image area.

When the voltage on a buffer gate reaches a peak value, the voltage drops sharply 1302. As a result, the charge transfers quickly from the buffer gate 1101 through the transfer gate 1102 with voltage waveform 1303 and into the horizontal serial register 1104. In this manner the serial register waveform 1304 does not need to pause for an extended period of time waiting for the charge to arrive and the imaging region waveforms can operate continuously.

The steep slopes of the voltage waveforms on the transfer gate 1303 and the buffer gate 1302 can create displacement currents and voltage noise in the substrate. Since the gate area and corresponding total capacitance is typically a very small fraction of the image area gates, this effect is relatively small. However, if further minimizing of voltage noise is desired, the present design may drive the buffer gates and the transfer gates using digital square voltage waveforms 180 degrees out of phase with each other and using conventional wave shaping low-pass filter techniques.

Figure 14:
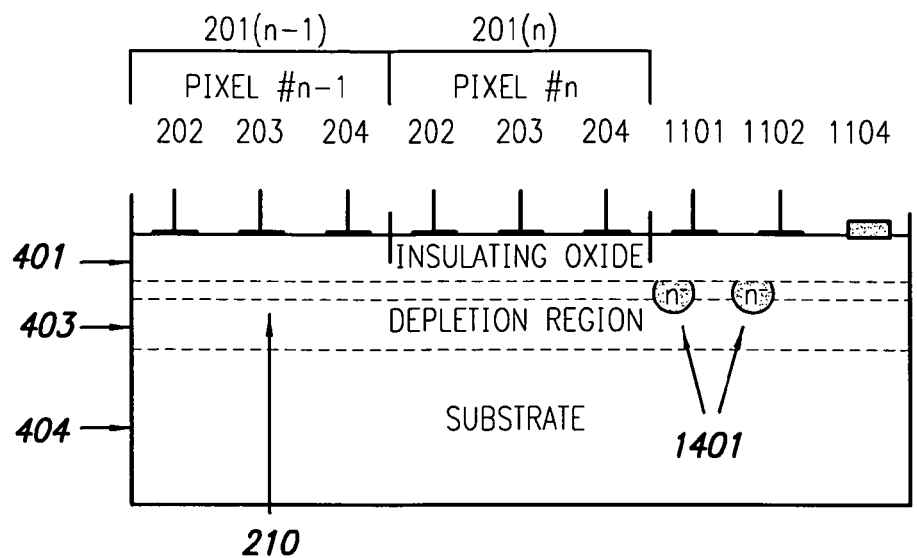
FIG. 14 illustrates a region of the buffer and transfer gates doped with impurity atoms.

Driving the buffer gates and the transfer gates with relatively fast voltage waveforms 180 degrees out of phase with one another provides a condition where charge may flow in the reverse of the desired direction, or from the buffer gate back into the image region. Part of the regions of the buffer gate 1101 and transfer gate 1102 may be doped with impurity atoms 1401, as shown in FIG. 14, to supply a built-in voltage which prevents the backward movement of charge into the image region 204.

The system may provide waveforms so the transition times between pixels and gates are relatively longer than the timing jitter between waveforms. Providing the longest practical transition times can reduce high-frequency fluctuations and can reduce peak substrate currents.

FIG. 15 shows the serial output region 1500 of a sensor including a buffer gate 1501, transfer gate 1502, serial register 1503, serial buffer gate 1504, floating diffusion implant 1505, and output amplifier stage 1506. While low speed sensors typically have one serial output region such as that shown in FIG. 15, a high-speed device may include many such regions placed adjacently for simultaneous readout.

Figure 16:
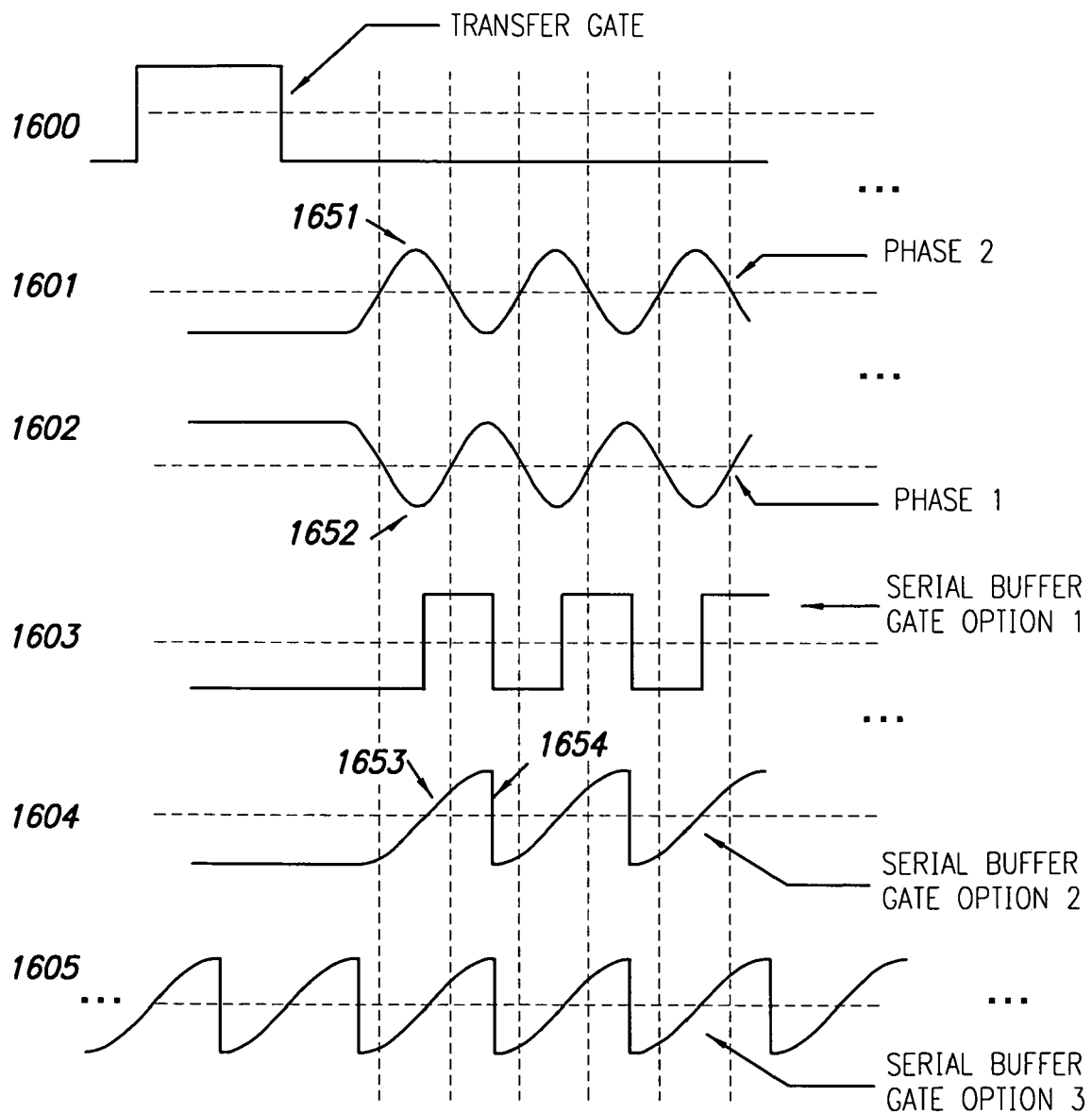
FIG. 16 shows the timing and qualitative waveform shapes suitable for continuous clocking and improved signal-to-noise performance of the serial register region.

FIG. 16 shows the timing and qualitative waveform shapes suitable for continuous clocking and improved signal-to-noise performance of the serial register region. The image region transfer gate 1600 is shown for reference and comparison to other timing signals. The two-phase device timing case shown incorporates sinusoidal waveforms displaced by 180 degrees where the sum of the slopes results in a zero or near zero net return ground current to the substrate. The voltages of the two waveforms may differ slightly to compensate for differences in capacitance of each phase so the resulting cancellation of return currents can be improved. One option for the serial buffer gate waveform is a square wave 1603 synchronized to the phase 1 waveform 1602 and phase 2 waveform 1601. This square wave drive method may be used for high-speed and high-signal-to-noise operation. Alternately, the serial buffer gate voltage waveform 1604 may be a composite waveform including a sinusoidal portion and a step portion. The step portion tends to move charge quickly from the serial buffer gate region into the floating diffusion region. The remainder of the composite waveform smoothly returns the voltage to the requisite level at a time just before the step portion. This composite waveform generally has the same fundamental frequency as the square wave but less high frequency harmonic content.

The serial buffer gate composite waveform may operate simultaneous with the serial register gates and cease when the serial register gates stop. This allows the image signal charge to be transferred into the serial register. Alternately, the serial buffer gate waveform may operate continuously, as shown in waveform 1605. Continuous operation may alleviate start-up issues for the serial buffer gate drive circuit or the associated power supply where the first few waveform cycles provide a slight voltage difference or timing shift compared to later cycles.

Figure 12:
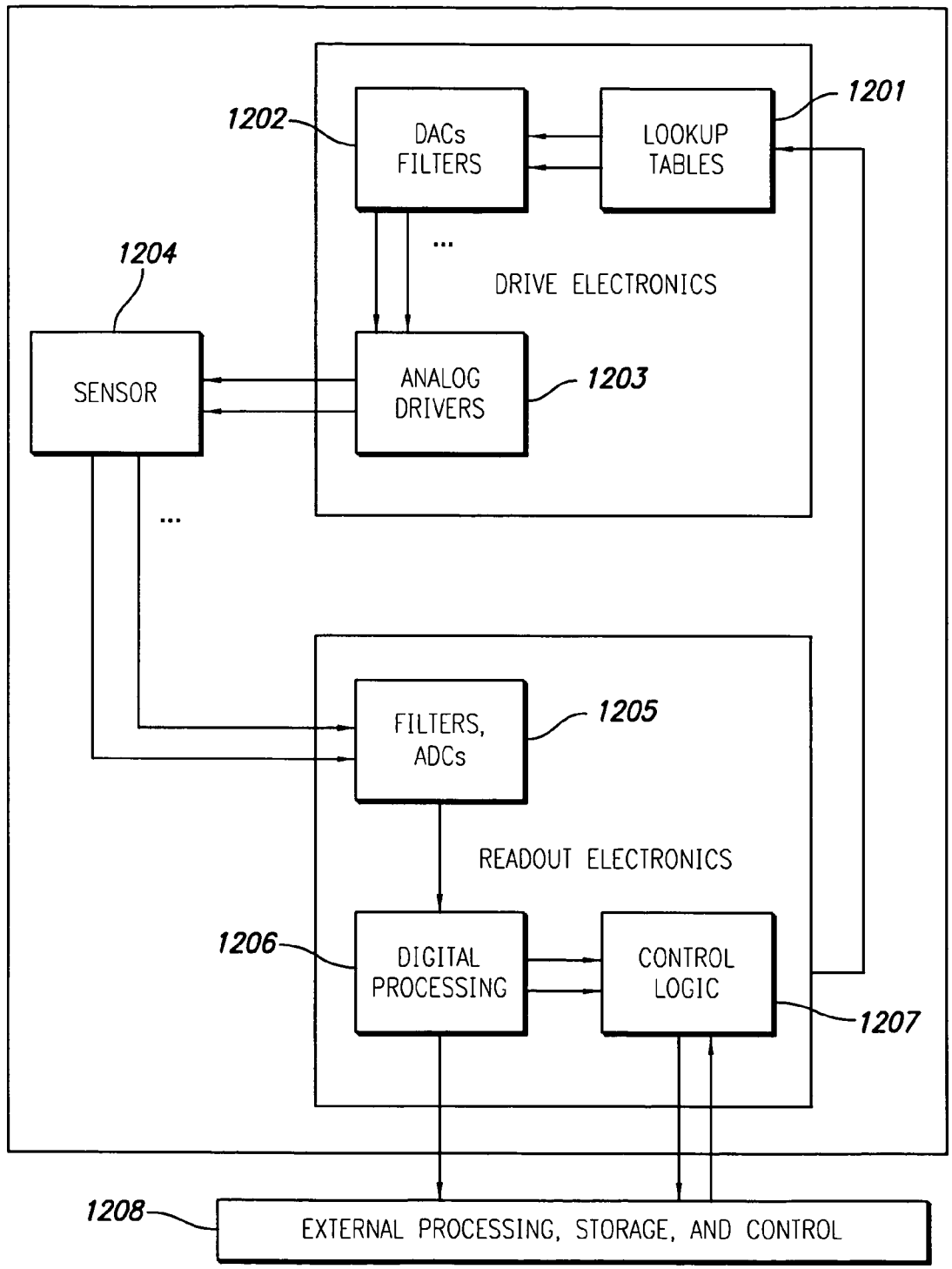
FIG. 12 shows the apparatus for continuous clocking including digital lookup tables, digital-to-analog conversion, analog-to-digital conversion, digital processing, and control of the waveforms.

One embodiment of an apparatus implementing features described herein is shown in FIG. 12. The apparatus includes four major sections designated "Drive Electronics," "Sensor," "Readout Electronics," and "External Storage, Processing, and Control." Within the drive electronics section may be a series of lookup tables 1201 of values describing waveform shapes and related drive signal information, circuitry such as digital-to-analog converters (DACs) along with signal filters 1202, and signal drivers 1203, typically analog, to amplify the signals and deliver them to the sensor 1204. The sensor 1204 provides analog output to the readout electronics section. The readout electronics section may include circuitry such as filters and analog-to-digital converters 1205, digital processing circuitry 1206, and control logic 1207. The control logic 1207 and other sections may interface with external storage, processing, and control systems 1208 for higher level control as well as low level synchronization, such as clock interfacing. The control logic 1207 may directly feed back in real-time or at predefined intervals to the lookup tables 1201 to modify waveforms and related data as needed to optimize synchronization and other sensor performance parameters.

Implementation

Implementation of the design outlined above may take varying forms. One such implementation can serve, in certain circumstances, to decrease timing jitter while at the same time enhancing charge transference. The present design implements continuous clocking in a manner that allows relatively smooth and broad adjustment of TDI image tracking speed to accommodate stage speed variations.

The present design uses FPGA chips (Field Programmable Gate Array) containing tables of digital values output to multiple digital to analog converters (DACs), such as to four DACs. One FPGA chip may be employed to interface with the DACs to provide relatively well synchronized clock signals for the TDI sensor.

In the present design, the FPGA outputs a number, represented as a series of logic states, on output pins which flows into a digital-to analog converter (DAC). The DAC responds by outputting a voltage. The magnitude and the sign of that voltage depend on the number received from the FPGA.

The FPGA outputs a digital series of numbers at a regular rate. For example, the FPGA might output a different number on a regular basis, such as every 10 nanoseconds. The value of the voltage emitted by the DAC changes regularly, such as every 10 nanoseconds. Appropriate programming of the FPGA and filtering of the DAC output tends to cause the circuit to output a smooth, continuous, analog voltage waveform. This continuous voltage waveform produces clock signals for the TDI sensor.

To provide close synchronization of key clock signals, a single FPGA interfaces with multiple DAC's running lock-step in parallel. The FPGA outputs a different number to each DAC, delivering those numbers simultaneously. Each DAC then changes voltage at the same time. In this way, the circuit produces a well-defined set of waveforms controlled and timed precisely relative to all other waveforms.

The structure of the TDI sensor incorporates a bulk silicon substrate, an oxide insulating layer, and conducting polysilicon gates. The two conducting layers on opposite sides of the insulating layer effectively form a capacitor. When the system electronics apply a voltage to a polysilicon gate to move charge from one pixel to the next, a displacement current flows in the substrate to complete the circuit. Voltage fluctuations from the resulting displacement current are called "clock feed through" or "ground bounce." The magnitude of the displacement current from a capacitively-coupled source is proportional to the capacitance times the rate of change of the voltage. Since a large fraction of a CCD or TDI device is covered with charge storage gates to capture the image and up to one third or one half of the gates may receive the same voltage waveform then, as a result, the displacement current in the substrate can be substantially large when the gates are clocked to move the charge.

The displacement current causes voltage fluctuations or spikes in the substrate. The voltage spikes contribute to measurement noise because the read-out amplifiers read signal voltages relative to the substrate voltage.

Figure 17:
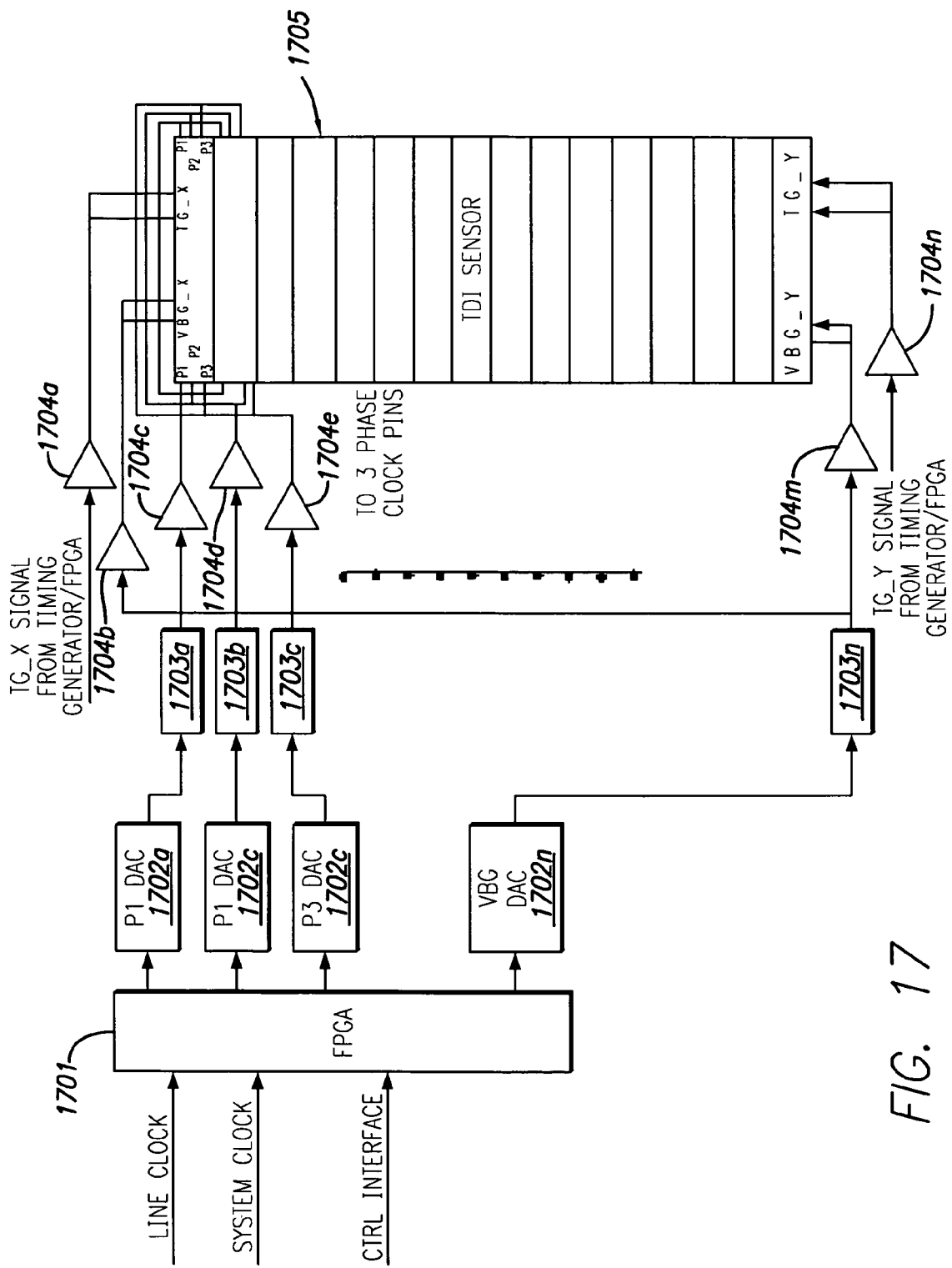
FIG. 17 illustrates a block diagram of a digital arbitrary waveform three signal generation drive circuit and sensor.

FIG. 17 illustrates a block diagram of a digital arbitrary waveform three signal generation drive circuit and sensor, here a TDI sensor. One FPGA 1701 is shown, but more may be employed. The FPGA 1701 receives line clock as an input, system clock, and a control interface, where the control interface provides the particulars of the desired waveform, such as period and amplitude. Operation of FPGA 1701 is detailed in FIG. 19. In the configuration shown, multiple DACs are provided to convert the digital signals from FPGA 1701 into analog values. In this configuration, DACs 1702a, 1702b, 1702c, and VBG (vertical buffer gate) DAC 1702n are provided in the view shown, where each DAC converts a digital signal received to an analog signal. Optional low pass filters 1703a, 1703b, 1703c, and 1703n in the view shown may be employed to lowpass the analog signals received. From this point, power drivers are provided to drive the signals received to the three phases of clock pins described above. Drivers 1704a-n are illustrated in FIG. 17, but more drivers may be employed. Driver 1704a receives a timing signal X from a timing generator FPGA, while driver 1704n receives a timing signal Y from the timing generator FPGA. Each of these signals provides timing for performing transfer of signals out of the TDI sensor 1705 in different directions. The signals received from the DACs are provided to three phase pins on each side of each segment of the TDI sensor 1705 as shown. Signals from VBG DAC 1702n are optionally lowpass filtered and driven and provide X and Y VBG signals at X, Y side of TDI sensor 1705. Note that two of each of the signals VBG_X, VBG_Y, TG_X, and TG_Y are provided. Two of each of these signals are provided because, as shown in FIG. 11, one VBG and one TG signal are provided at the top X and bottom Y of the device. Two outputs are therefore required, and independent control of each signal requires two independent outputs.

In the presence of timing jitter or imprecisely controlled waveforms, the sum of the slopes of the three voltage waveforms generated may have a finite or non-zero value. These issues can be avoided using a design such as that presented in FIG. 17. FIG. 17 includes one FPGA interface with four DACs, generating four values per clock cycle, one for each DAC. All DACs receive values at the same time and use the same synchronization logic.

The design of FIG. 17 enables enhanced synchronization of waveforms. From FIG. 17, signals from the DACs pass through low-pass filters to remove high-frequency voltage fluctuations, then through power drivers such as analog operational amplifiers or buffer amplifiers so the signals can drive a larger load. The drivers can preserve the important waveform characteristics of the input signal, but deliver an output with a higher current or a higher voltage. The drivers may have different requirements for bandwidth or power, depending on the other elements employed in the circuit. The circuit may also require different digital or analog drivers for image area clocking, serial register clocking, or other functions.

The output from each DAC can pass to multiple drivers in parallel, depending on the power requirements for driving multi-taps of a TDI sensor. The output from each DAC can also pass to multiple drivers which fan out in parallel to drive many taps on the TDI sensor, where every signal received at a channel may have the same phase.

The circuit also contains a DAC for controlling a vertical buffer gate, as explained above. An alternate approach employing more conventional electronics may comprise a clock driver generating a square waveform, followed by a low-pass filter converting the square waveform into a smooth sinusoidal waveform.

Figure 18:
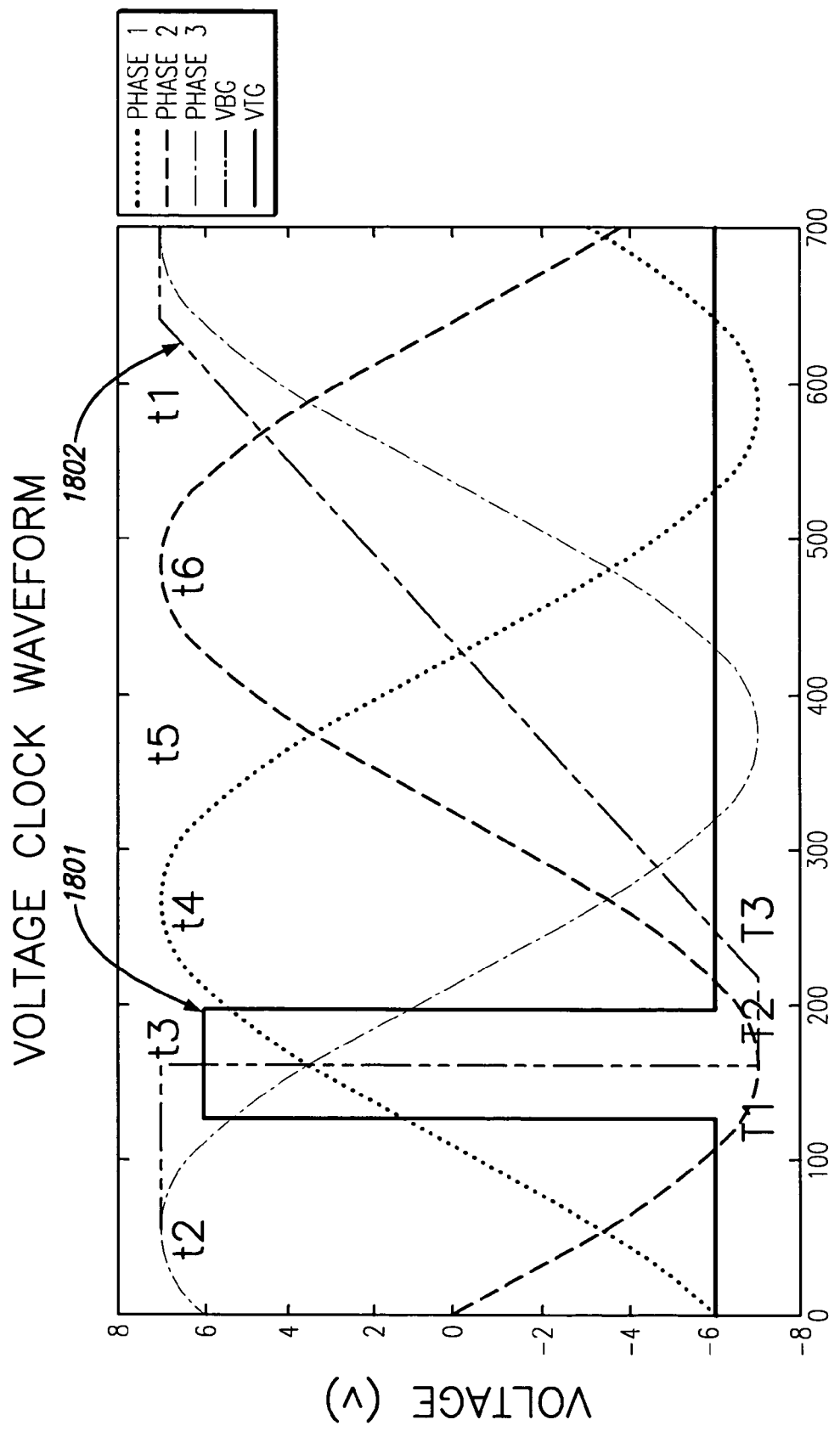
FIG. 18 presents various waveforms that may be generated by the design of FIG. 17.

FIG. 18 illustrates various waveforms that may be generated by the design of FIG. 17. The periodic TG timing signal 1801 is illustrated, as is the sawtooth VBG signal 1802, with voltage shown on the left of the graph and time on the bottom. The waveforms generated are three phase sinusoids used to smoothly move the charge "vertically" through the TDI sensor 1705. From FIG. 18, the current from power supply caused by each waveform is proportional to the slope of the curve. The three waveforms are 120 degrees out of phase. At any moment, the sum of the current of the three waveforms is zero. As a result, the net current from these sources is always zero, and voltage spikes do not occur. Certain nonlinearities and resultant errors may occur, but the foregoing is the result in a perfect situation.

Figure 19:
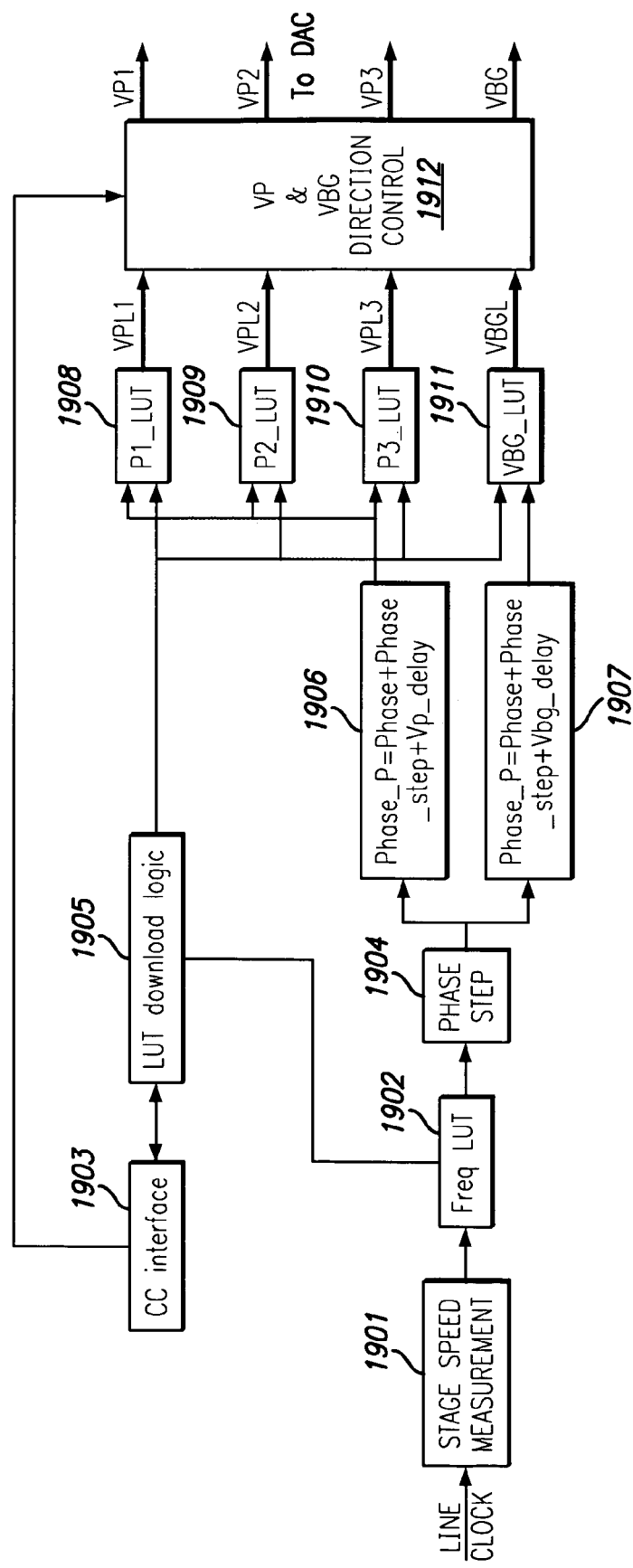
FIG. 19 is one embodiment of FPGA logic used to drive the signals in the manner shown in, for example, FIG. 18.

One embodiment of FPGA logic 1701 used to drive the signals in the manner shown is illustrated in FIG. 19. From FIG. 19, the FPGA uses direct digital synthesis methods to generate the desired continuous clock. Lookup tables are provided to generate the desired signals in the accordance with the design of FIG. 17. The lookup tables contain waveform shape and speed control information used to propagate the charges through the TDI sensor 1705. The line clock is received at tracking speed measurement block 1901, which provides tracking data to frequency look up table 1902 to set the frequency of continuous clocking. The speed measurement block 1901 synchronizes continuous waveforms with external devices such as mechanical stages, in particular the speed of the stage. Continuous Clocking Interface 1903 represents an interface between the FPGA and a host computer where the Continuous Clocking Interface 1903 is used to download data to all look up tables and set the operating mode.

Phase step register 1904 stores the phase incremental step from frequency LUT 1902 and provides the phase step to Vp phase accumulator block 1906 and Vbg phase accumulator block 1907. The phase step register continuously varies the TDI sensor speed by varying the output waveform frequency. Vp phase accumulator block 1906 computes the phase based on:

$$\text{Phase\_}P = \text{Phase} + \text{Phase\_step} + Vp\_\text{delay} \quad (2)$$

where Phase_P is the corrected phase, Phase represents the current phase, Phase_step represents the step in phase computed by phase step block 1904, and Vp_delay represents the delay in the expected processing delay in implementing the phase from this point forward. Vbg phase accumulator block 1907 computes the phase based on:

$$\text{Phase\_}P = \text{Phase} + \text{Phase\_step} + Vbg\_\text{delay} \quad (3)$$

Equation (3) is identical to Equation (2) except for the delay, here representing the expected delay in the Vbg or VBG path.

The VP and VBG frequency is based on:

$$f = \frac{F}{2^n} \times f_{clk} \quad (4)$$

where F is a tuning value, n represents the accumulator width in bits, and $f_{clk}$ is the clock frequency of the clock driving phase accumulator blocks 1906 and 1907. Vp_delay and Vbg_delay can be used to adjust the phase difference between VP and VBG. VP and VBG direction control block 1912 allows for bidirectional scanning, i.e. scanning in a forward or reverse direction.

The design of FIG. 19 is constructed to output the values or numbers providing inputs to the DAC chips. By sampling those numbers in different ways, the FPGA can control the frequency of the voltage waveforms emitted by the DAC chips and thereby control the speed of the TDI sensor. The FPGA can also synchronize the speed of the TDI sensor with the speed of the stage.

Figure 20:
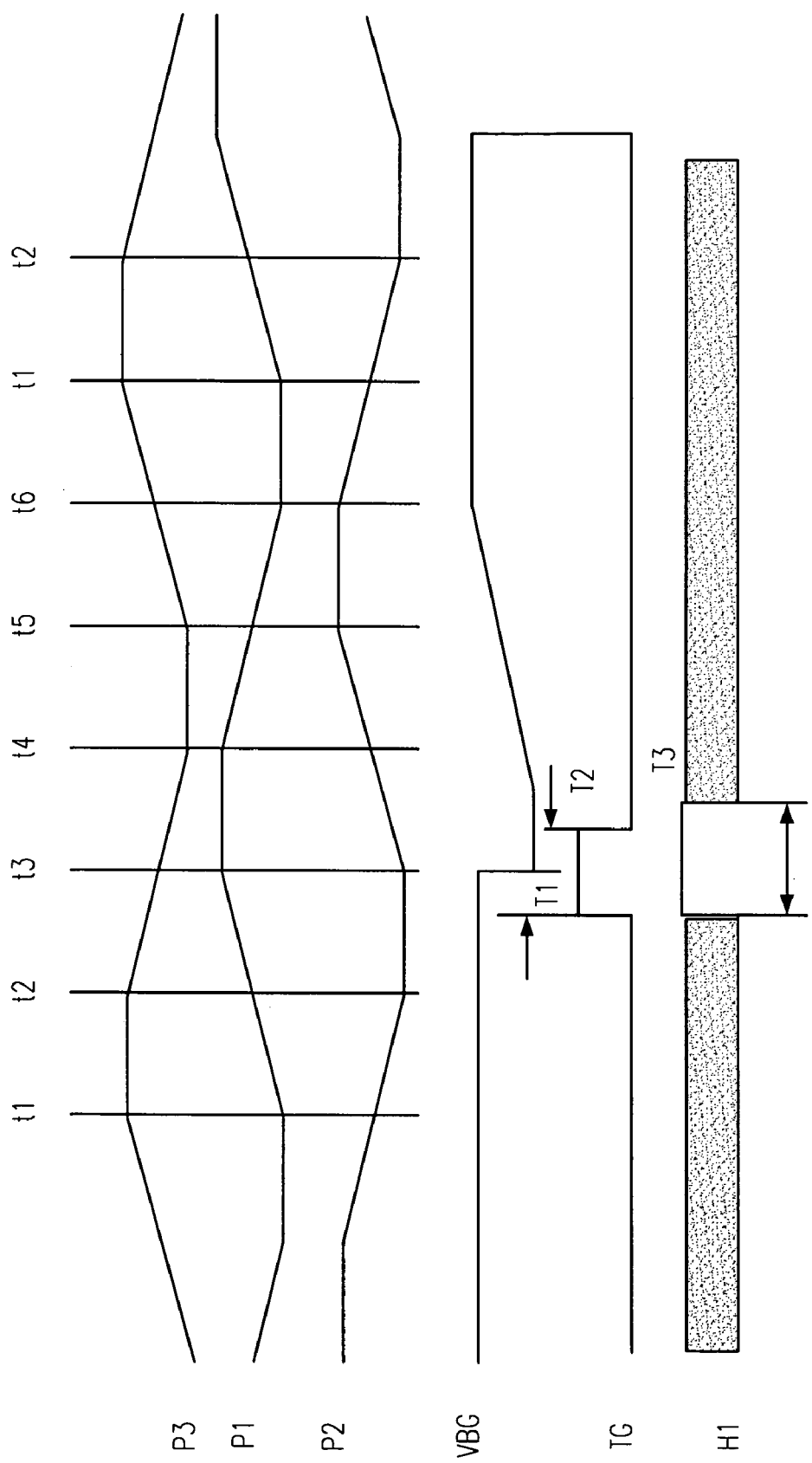
FIG. 20 illustrates a trapezoidal waveform that may be transmitted using the waveform lookup tables and design presented.

Waveform lookup tables are generally flexible and may employ a number of waveforms. One additional waveform beyond those disclosed above is illustrated in FIG. 20. FIG. 20 illustrates a trapezoidal waveform that may be transmitted using the waveform lookup tables and design presented. Each waveform ascends slowly over two cycles, remains flat for one cycle, and descends for two cycles. During any clock cycle, one of the three waveforms is flat and the other two waveforms have opposite slopes. With precise timing, the sum of the slopes of the waveforms is always zero, and the resultant net displacement current is zero. Voltage spikes do not occur in the substrate, and the system can read voltage signals with high sensitivity.

The trapezoidal waveform approach is less sensitive to timing errors than the square waveform approach. For the three-phase trapezoidal waveform the ideal net return current is zero, which is not true for the burst-clocking square-wave mode. Also, if one of the three waveforms shifts in time relative to the other-two waveforms, the result can be a smaller change in displacement current and a smaller voltage fluctuation in the substrate. These results occur because the slopes of the waveforms are smaller than those of square waves. Using the sinusoidal waveform approach, one waveform shift relative to the other two waveforms can yield a sine wave signal current with small amplitude and low, single frequency. Larger errors result from the trapezoidal waveform approach due to the higher harmonics present, and a square wave timing error provides significant amounts of still higher harmonics, resulting in current fluctuations not present in the sinusoidal wave approach.

In general, the lookup tables on the right side of FIG. 19 contain a large series of memory addresses, each address containing a value. For example, 1000 memory addresses and corresponding values in the lookup tables might correspond to one cycle of a sine wave. The consecutive values, when sent to DAC chips in sequence, can cause the DACs to output smooth, sinusoidal voltage curves. The relatively large series of numbers is incremented with small steps in value. Sending each number in the series consecutively can cause the voltage curves to change slowly as compared to the DAC update rate.

Analog output signal frequency can be adjusted with fine control using the FPGA logic. The Phase Step register 1902 determines the number of memory addresses to skip on each cycle. For example, if set at 10, the Phase Step register 1921 causes the FPGA to send values from every $10^{th}$ memory address rather than the values from each memory address consecutively. As a result, the sinusoidal voltage waveforms output by the DACs advance through a full 360-degree cycle 10 times faster than they would were the FPGA logic extracting numbers from consecutive memory addresses in the lookup tables.

The number of the memory address targeted during each cycle may be augmented by an offset value independent of the Phase Step register setting. Such augmentation compensates for changes in the optical magnification as well as changes in other system parameters.

Inspection using Tracking Counter and Stage Synchronization

Information accumulates on a TDI sensor as the stage moves the surface being inspected. The system moves information across the sensor at close to the same rate at which the wafer stage moves to acquire a clear image. This rate is generally adjusted to compensate for the magnification/demagnification of the imaging system. Stage speed measurement block 1901 synchronizes the sensor with the stage (not shown) and adjusts the behavior of the FPGA logic so that FPGA output causes the DACs to output voltage waveforms having frequencies that move signals across the TDI sensor at the same speed as the stage.

The stage speed measurement block 1901 synchronizes the sensor with the stage. The tracking counter may include a counter updated at regular intervals by internal digital clocking and may use steps, i.e. stepped digital values, proportional to the phase step size. The stage speed measurement block 1901 receives a series of pulses, or pulse-train signal, from the stage subsystem. The frequency of the input signal corresponds to the stage speed. When an input signal pulse occurs, the tracking counter logic in the Stage speed measurement block 1901 checks the count value when the FPGA line clock has occurred.

The present design keeps the tracking error from becoming relatively large but produces a relatively small change on every cycle. To control the speed in a smoother way, the same adjustments may be made over longer time scales. For example, adjustments may be made only every 5 or 10 cycles of the sinusoidal input signal from the stage, rather than every cycle. An algorithm that adjusts the Phase Step register 1921 when the difference in timing between the stage and the TDI sensor exceeds a certain threshold may also be employed. Such a design may work better when, for example, the instantaneous stage position measurement derived from an encoder is imperfect.

Power Dissipation

Figure 21:
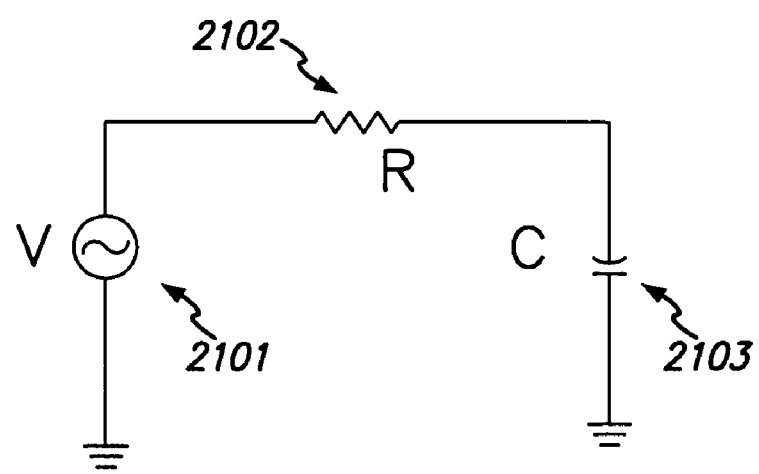
FIG. 21 represents a circuit representing the present design for various purposes, including illustrating heat dissipation.

In a TDI sensor, the instantaneous power dissipation is proportional to the voltage across resistive components multiplied by the current. Power dissipation can be illustrated using the simple circuit in FIG. 21, where a voltage source 2101 provides voltage to a real-valued ideal resistor 2102. An ideal capacitor 2103 is connected to the resistor and the ground reference. In typical cases, the capacitor charges quickly during a waveform cycle. The voltage across the resistor is non-zero during a relatively fast waveform cycle transition, such as a square wave, and approaches zero after some settling time.

Integrating the instantaneous power over one repeating cycle of device operation gives the average power dissipation. For the case described, the power dissipation generally achieves maximum value during fast transitions such as square wave operation.

In the sinusoidal waveforms provided herein, the slope of the voltage versus time curve is less steep and worst-case instantaneous power dissipation tends to be much lower. For the sinusoidal waveform case, average power dissipation also tends to be significantly lower than the square-wave case. Reduced power dissipation provides advantages for very high speed devices that may need thermal management systems.

Feed-Through Correction

When the system accurately controls the shape and the timing of the sinusoidal waveforms, the net displacement current or feed through is zero or near zero. To the degree that the shape and the timing are imperfect or where a system parameter such as gate capacitance is not precisely known, some current feed through can occur. The present design may monitor and correct for measured feed through.

One way to correct for the feed through is to adjust the amplitudes and/or the phases of two or more of the waveforms. An alternative approach is to adjust both the phase and amplitude of a single waveform. The present design adjusts the amplitude and the phase using a single waveform. A system of m waveforms is described in time according to Equation (5).

$$Sig(t) := \sum_{n=0}^{m-1} [A_n \cdot e^{1 j \cdot 2\pi \cdot (t - \frac{n}{m} - \phi_n)}] \quad (5)$$

Equation (5) represents the resulting signal Sig(t) described as the summation of m vectors. The amplitudes and phases of each component n are given by $A_n$ and $\phi_n$.

Figure 22:
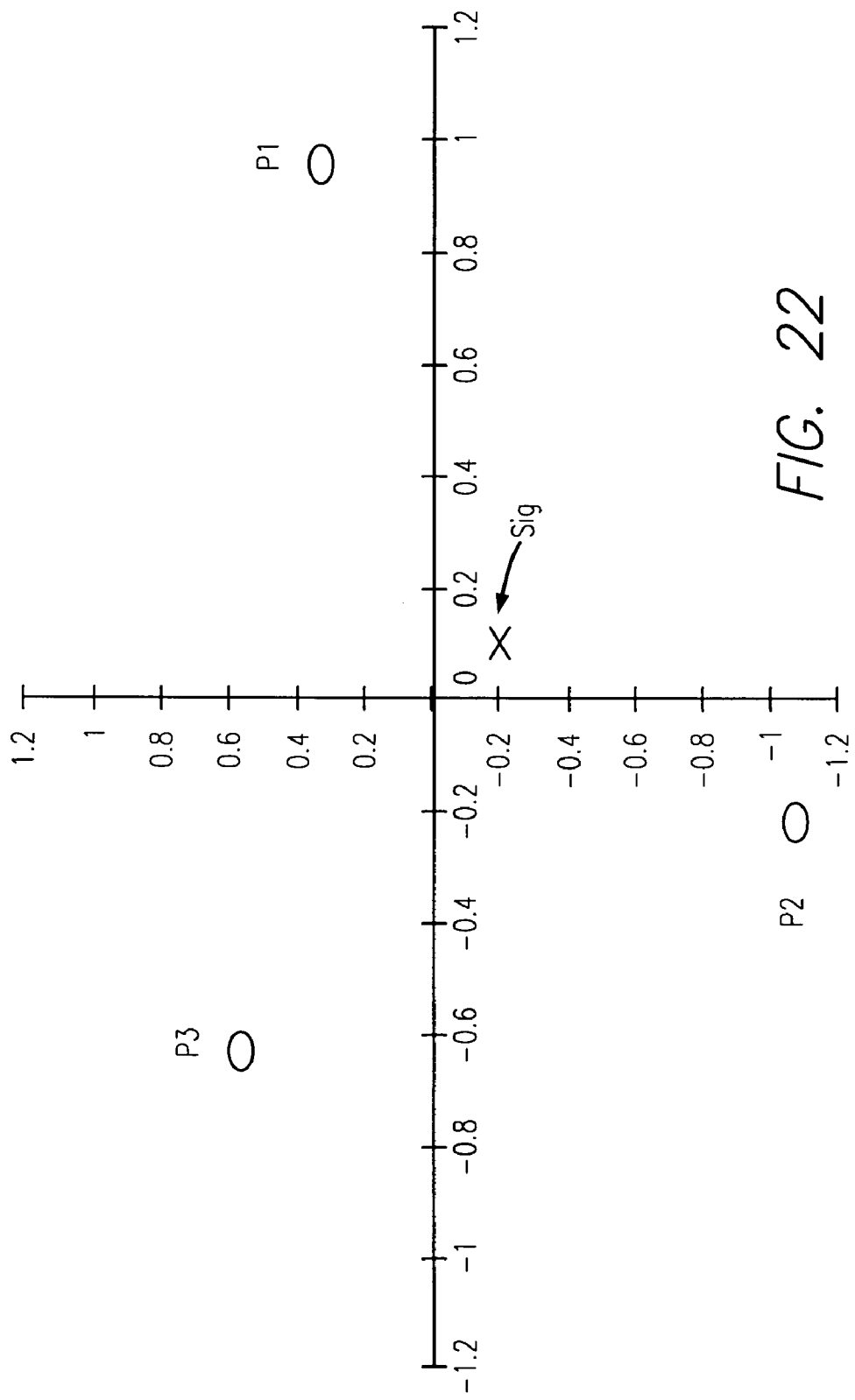
FIG. 22 is a plot in the complex plane of the three components for three signals, used to show the application of Equation (5)

Use of Equation (5) to correct for amplitude and phase errors in the three signals is as follows. FIG. 22 is a plot in the complex plane of the three components for m equal to 3 (three signals generated, each 120 degrees out of phase) case. The points P1, P2, and P3 on the graph illustrate three vectors that correspond to sinusoidal waveforms in amplitude (distance from origin) and phase (vector angle from positive x-axis or waveform relative timing). The resultant signal (letter X) represents the vector sum which is the net imbalance of the three waveforms P1, P2, and P3. When the amplitude and phase of the three waveforms are in balance, the resultant signal will be zero, and the vector sum X will be located at the origin. The net displacement current is the time derivative of the signal, also a sinusoidal waveform. When the sum of the vectors is zero, the resulting displacement current also becomes zero.

Figure 23:
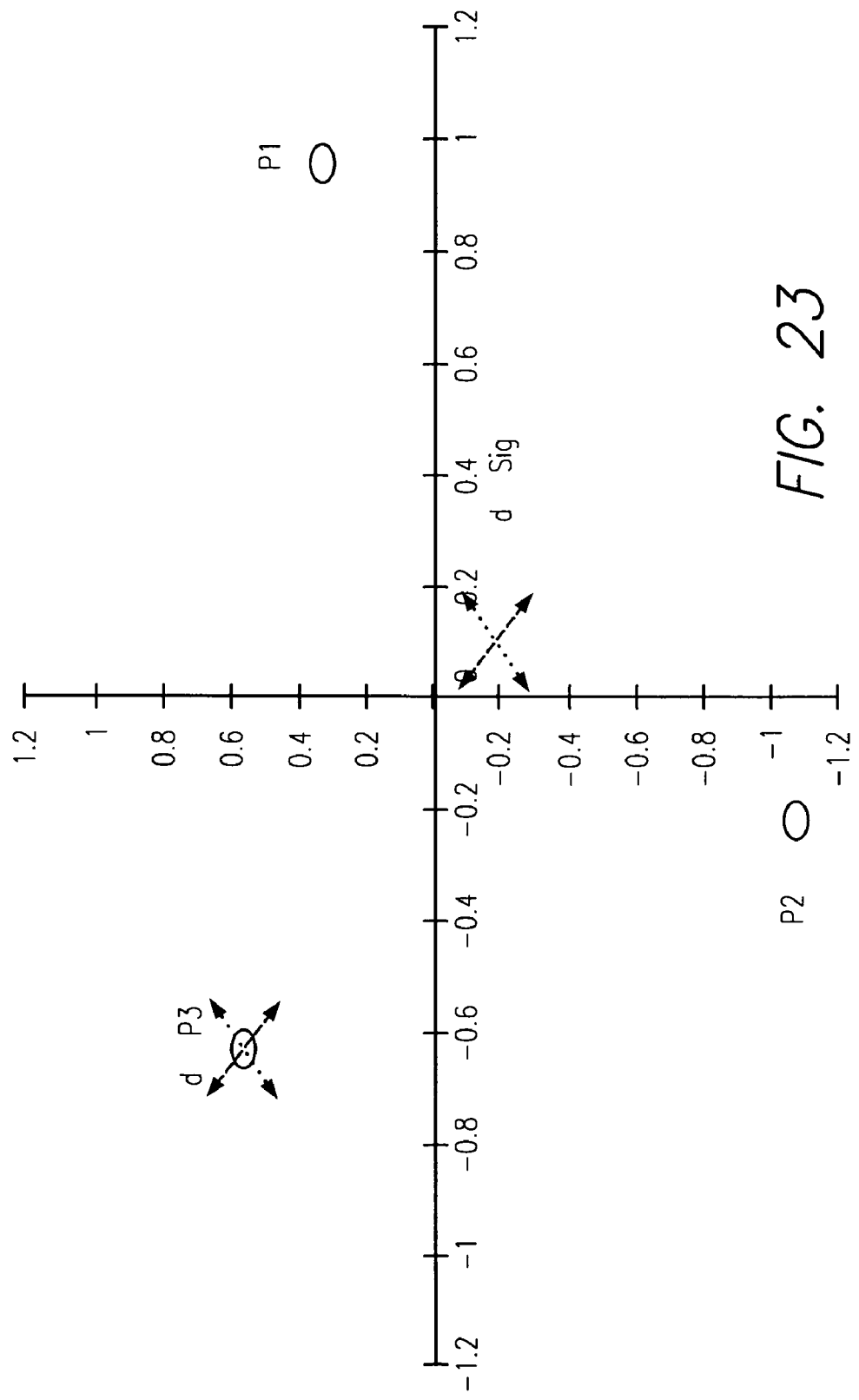
FIG. 23 shows moving the error signal to the origin by adjusting the amplitude and phase of one of the three waveforms.

When the amplitudes and phases are not equal, FIG. 23 illustrates that moving the error signal to the origin can be accomplished by adjusting the amplitude and phase of one of the three waveforms. For example, by changing the phase and amplitude of P3 alone (i.e., changing it by dP3), the resulting "error" signal (dsig) moves toward the origin. Measuring the sinusoidal error signal using the ADC circuitry and digital processing of the data enables the desired value of P3 to be derived by subtracting the error vector from the original P3 vector. For a system using well-known correlated-double-sampling methods (CDS) and measuring both reset and pixel values separately, reset value measurement data can be used to extract an error signal that can be used to correct the signals. Corrections of this nature may be accomplished as a discrete calibration step or as part of a real-time closed feedback loop.

Corrections Involving Nonlinearities and Non-Ideal Capacitors

As noted, the bulk silicon layer and the conducting polysilicon gates separated by an insulating oxide layer form a capacitor. A voltage applied to a gate results in a displacement current. The magnitude of the displacement current is directly proportional to the capacitance (see FIG. 21) multiplied by the rate of change of the voltage. When the three waveforms are ideally shaped and 120 degrees out of phase, the net displacement current is zero, minimizing the risks of voltage spikes.

This ideal performance profile would be true if the capacitance were constant. However, capacitance of the gates varies slightly as a function of voltage because carrier depletion changes the effective thickness of the capacitor. As a result, the relationship between the gate voltage and the displacement current tends to be nonlinear. This nonlinearity can introduce frequency harmonics in the displacement current; i.e., the value of the displacement current takes the form of a distorted sine curve. Residual displacement current of the harmonics can be cancelled by adding the specific frequency component (with an opposite sign) to the drive signal. This residual current addition can also cancel arbitrary feed through signals, including those generated by electronics other than the drive signals. An algorithm can measure the waveform shape in the substrate of the TDI sensor and modify the look-up table in the FPGA to provide any necessary correction.

Further, the physical structure of the TDI sensor might not produce ideal results due to the nonuniformity of the capacitors employed. The capacitance is the area of the gate divided by the thickness of the capacitor, dimensions that vary on nanometer scales in this application. Since the capacitance of the gates typically varies by a few percent, the displacement currents created by different gates do not cancel exactly. The small net displacement current can cause small voltage fluctuations, increasing the noise floor of the measurement.

The distortions caused by nonlinearities and by variations in the physical structures of the capacitors are typically small effects. Corrections for these errors can occur by measuring the residual displacement current with an oscilloscope, changing a lookup table in the FPGA to compensate the input waveform to remove the errors, measuring the displacement current again, and changing the input in an iterative process. Alternatively, the ADC components of the sensor board can measure the voltage fluctuations due to displacement currents and on-board hardware, firmware, or software can calculate the sinusoidal coefficients of the feed-through voltage signal.

The design presented herein and the specific aspects illustrated are meant not to be limiting, but may include alternate components while still incorporating the teachings and benefits of the invention, namely the implementation employed to transfer charge within a TDI sensor using continuous clocking or non-square voltage waveforms. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A sensing system, comprising:
a field programmable gate array (FPGA);
a plurality of signal digital to analog converters (DACs) connected to the FPGA, the plurality of signal DACs receiving at least three variable signals from the FPGA, wherein each variable signal received from the FPGA is nonsquare and out of phase from other variable signals; and
a sensor comprising multiple inputs configured to receive variable signals from the plurality of signal DACs;
wherein the variable signals from the plurality of signal DACs cause the sensor to transfer charges in the sensor toward an end of the sensor, and further wherein the at least three variable signals are provided by the FPGA such that the at least three variable signals are correctable by selectively altering signal parameters for one variable signal to minimize net displacement current transmitted to the sensor while transferring charges.

2. The sensing system of claim 1, wherein said FPGA contains logic configured to provide the variable signals using a plurality of lookup tables.

3. The sensing system of claim 2, wherein the FPGA further comprises logic for synchronizing a stage holding a specimen being inspected with the sensor.

4. The sensing system of claim 1, further comprising a vertical buffer gate (VBG) DAC, said VBG DAC configured to receive data from the FPGA and provide a bit gate signal to drive charges in the sensor toward the end of the sensor.

5. The sensing system of claim 1, wherein the variable signals comprise sinusoidal signals.

6. The sensing system of claim 1, wherein the variable signals comprise trapezoidal signals.

7. The sensing system of claim 1, further comprising a plurality of drivers between said DACs and said sensor to drive the variable signals to the sensor.

8. The sensing system of claim 2, wherein said logic is further configured to correct the variable signals to minimize net displacement current transmitted to the sensor.

9. The sensing system of claim 8, wherein said logic corrects the variable signals by altering amplitude and phase of one signal.

10. The sensing system of claim 1, wherein the sensor comprises a time delay and integration (TDI) sensor.

11. A method for operating a sensor array comprising a plurality of sensing elements, comprising:
generating at least three variable signals using a field programmable gate array (FPGA), each variable signal having nonsquare shape and having a phase different from each other variable signal; and
providing said at least three variable signals to the sensor array;
wherein said at least three variable signals provided to the multiple elements on the sensor array cause the sensor array to drive electrical charges toward one end of the sensor array and further wherein the at least three variable signals are provided such that the at least three variable signals are correctable by selectively altering signal parameters for one variable signal to minimize net displacement current transmitted to the sensor while transferring charges.

12. The method of claim 11, wherein said FPGA contains logic configured to provide the variable signals using a plurality of lookup tables.

13. The method of claim 12, wherein the FPGA further comprises logic for synchronizing a stage holding a specimen being inspected with the sensor array.

14. The method of claim 11, wherein the variable signals comprise sinusoidal signals.

15. The method of claim 11, wherein the variable signals comprise trapezoidal signals.

16. The method of claim 12, wherein said logic is further configured to correct the variable signals to minimize net displacement current transmitted to the sensor array.

17. The method of claim 16, wherein said logic corrects the variable signals by altering amplitude and phase of one signal.

18. A sensing apparatus, comprising:
a programmed processor, said processor programmed with logic configured to provide a set of values representing at least three out of phase sinusoidal signals;
a plurality of conversion elements, said plurality of conversion elements configured to receive the set of values, convert the set of values into a converted set of values having a different format, and transmit the converted set of values to a sensor comprising multiple inputs configured to receive the converted set of values;
wherein the converted set of signals received from the plurality of conversion elements cause the sensor to transfer charges in the sensor toward an end of the sensor, and further wherein the at least three out of phase sinusoidal signals are provided such that the three out of phase sinusoidal signals are correctable by selectively altering signal parameters for one out of phase sinusoidal signal to minimize net displacement current transmitted to the sensor while transferring charges.

19. A system comprising:
a field programmable gate array (FPGA) configured to provide at least three variable signals, wherein each variable signal provided from the FPGA is nonsquare and out of phase from other variable signals;
a plurality of signal digital to analog converters (DACs) configured to receive variable signals from the FPGA; and
a sensor configured to receive variable signals from the plurality of signal DACs;
wherein the variable signals from the plurality of signal DACs cause the sensor to transfer charges in the sensor toward an end of the sensor and further wherein the at least three variable signals are provided by the FPGA such that the at least three variable signals are correctable by selectively altering signal parameters for one variable signal to minimize net displacement current transmitted to the sensor while transferring charges.

20. The system of claim 19, wherein said FPGA contains logic configured to provide the variable signals using a plurality of lookup tables.

21. The system of claim 20, wherein the FPGA further comprises logic for synchronizing a stage holding a specimen being inspected with the sensor.

22. The system of claim 19, further comprising a vertical buffer gate (VBG) DAC, said VBG DAC configured to receive data from the FPGA and provide a bit gate signal to drive charges in the sensor toward the end of the sensor.

23. The system of claim 19, wherein the variable signals comprise sinusoidal signals.

24. The system of claim 19, wherein the variable signals comprise trapezoidal signals.

25. The system of claim 19, further comprising a plurality of drivers between said DACs and said sensor to drive the variable signals to the sensor.

26. The system of claim 20, wherein said logic is further configured to correct the variable signals to minimize net displacement current transmitted to the sensor.

* * * * *